United States Patent [19]

Kedar et al.

[11] Patent Number: 4,750,171
[45] Date of Patent: Jun. 7, 1988

[54] DATA SWITCHING SYSTEM AND METHOD

[75] Inventors: Benjamin Kedar; Gerald P. Michalak, both of St. Petersburg

[73] Assignee: Tadiran Electronics Industries Ltd., Giv'at-Shmuel, Israel

[21] Appl. No.: 884,800

[22] Filed: Jul. 11, 1986

[51] Int. Cl.⁴ .............................................. H04J 3/26
[52] U.S. Cl. ........................................ 370/85; 370/94
[58] Field of Search ............................ 370/85, 89, 94; 340/825.5, 825.51

[56] References Cited

U.S. PATENT DOCUMENTS

| | | |
|---|---|---|
| 3,851,104 | 11/1974 | Willard et al. . |
| 3,924,077 | 12/1975 | Blakeslee . |
| 3,959,594 | 5/1976 | Srivastava . |
| 4,161,786 | 7/1979 | Hopkins et al. . |
| 4,210,780 | 7/1980 | Hopkins et al. . |
| 4,227,178 | 10/1980 | Gergaud et al. . |
| 4,234,952 | 11/1980 | Gable et al. . |
| 4,292,623 | 9/1981 | Eswaran et al. . |
| 4,330,886 | 5/1982 | Fukuda et al. . |
| 4,332,985 | 6/1982 | Samuel . |
| 4,390,982 | 6/1983 | Williams et al. . |
| 4,394,757 | 7/1983 | Muzumdar et al. . |
| 4,434,421 | 2/1984 | Baker et al. . |
| 4,450,554 | 5/1984 | Steensma et al. . |
| 4,463,351 | 7/1984 | Chiarottino . |
| 4,479,213 | 10/1984 | Galand et al. . |
| 4,494,230 | 1/1985 | Turner . |
| 4,506,361 | 3/1985 | Kume . |
| 4,514,843 | 4/1985 | Albanese . |
| 4,516,205 | 5/1985 | Eing et al. . |
| 4,516,239 | 5/1985 | Maxemchuk . |
| 4,524,244 | 6/1985 | Faggin et al. . |
| 4,530,093 | 7/1985 | Akram et al. . |
| 4,536,875 | 8/1985 | Kume et al. .......................... 370/85 |
| 4,538,261 | 8/1985 | Kume . |
| 4,542,499 | 9/1985 | Bella et al. . |
| 4,543,574 | 9/1985 | Takagi et al. . |
| 4,550,402 | 10/1985 | Gable et al. . |
| 4,564,838 | 1/1986 | Boulogne et al. . |
| 4,568,930 | 2/1986 | Livingston et al. . |
| 4,573,045 | 2/1986 | Galin . |
| 4,578,789 | 3/1986 | Middleton et al. . |

OTHER PUBLICATIONS

"A Carrier Sense Multiple Access Protocol for Local Networks," Simon S. Lam, Department of Computer Sciences, University of Texas at Austin, Austin, Tex. 78712, pp. 21-32.

"Performance Analysis of Carrier Sense Multiple Access with Collision Detection," Fouad A. Tobagi et al., Computer Systems Laboratory, Stanford University, Stanford, Calif., pp. 245-259.

"Carrier Sense Subset Multiple Access System," L. P. West, IBM Technical Disclosure Bulletin, vol. 22, No. 11, Apr. 1980, pp. 4811-4812.

"Decentralized Bus Architecture with Collision (List continued on next page.)

Primary Examiner—Douglas W. Olms
Attorney, Agent, or Firm—Oblon, Fisher, Spivak, McClelland & Maier

[57] ABSTRACT

A high speed data bus is time division multiplexed into multiple logical timeslot channels. Each of these timeslot channels is dynamically allocated to multiple endpoints within the data communication system. Each of these timeslot channels is shared from multiple communication sessions by the endpoints using a CMSA/CD methodology for allocating asynchronously usage of the timeslot channels. Additionally, network terminators may be used which may support multiple logical sessions by dedicating a timeslot channel to a network terminator and having other multiple endpoints coupled to this network terminator by way of the shared channel access protocol. Multiple copies of the shared channel access protocol procedure are located at a network terminator to handle multiple usages of the peripheral bus by the network terminator.

22 Claims, 16 Drawing Sheets

OTHER PUBLICATIONS

Retry," D. F. Bantz et al., IBM Technical Disclosure Bulletin, vol. 23, No. 2, Jul. 1980, pp. 858-861.
"Signalling in a Decentralized Subscriber Stage," Section (50A8), Bernd Lubben, University Hannover, International Switching Symposium, Paris, France, 7-11 May 1979, pp. 1241-1245.
"A Worldwide Integrated Service Communication System for Voice and Non-Voice," Keisuke Tomaru et al., Hitachi Ltd., Totsuka Works, Yokohama, Japan, pp. 45-47.
"Multiacess Protocols in Packet Communication Systems," Fouada Tobagi, IEEE Transactions on Communications, vol. Com. 28, No. 4, pp. 468-488.
"Flexible Multiplexing Technique with Two Types of Packet for Circuit & Packet Switched Traffic," Hideo Miyahara et al., The Transactions of the IECE of Japan, vol. E64, No. 6, Jun. 1981, pp. 390-397.
AT&T DMI Specification, Apr. 1985.
CCITT, X.3, Packet Assembly/Disassembly Facility (PAD) in a Public Data Network.
CCITT, X.25, Interface Between Data Terminal Equipment (DTE) and Data Circuit Terminating Equipment (DCE) for Terminals Operating in the Packet Mode on Public Data Networks, pp. 100-189.
Intel, 8274, Multi-Protocol Serial Controller (MPSC), pp. 7-200-7-236.
Intel, iATC 2952, Integrated Line Card Controller, pp. 3-22-3-36.
Intel, 82C37A-5, Chomos High Performance Programmable DMA Controller, pp. 5-57-5-66.
Siemens, PBC Peripheral Board Controller, PEB 2050, Technical Description (Part I), pp. 1-25.
Siemens, Peripheral Board Controller, PEB 2050, Preliminary Technical Description (Part II), pp. 1-12.

DELAYED DEFERRENCE

COLLISION DETECTION (TWO SIDED)

DATA SWITCHING SYSTEM AND METHOD

BACKGROUND OF THE INVENTION

1. Field of the Invention

This invention relates generally to the data switching and asynchronous multiplexing in a synchronous data communication system.

2. Discussion of the Background

It is well known that there is an ever increasing need for higher speeds within communication controllers for the transfer of data.

More specifically, increased and ever growing pressure for enhanced office efficiency require that increased data communication speeds be available on "voice/data systems". As these systems grow in cost and complexity, it is also desirable that they be readily and efficiently expanded, without the necessity of abandoning previously purchased components. A continuously expandable modularized approach to such systems is thus highly desirable.

Conventional time division multiplex systems are well known in the art, for example, as disclosed in U.S. Pat. Nos. 4,390,982 to Williams et al or 3,924,077 to Blakeslee, however, these are synchronous only type systems which waste communication capabilities. Specifically, in a pure synchronous time division multiplex system each "timeslot channel" which is carved out of the communication media by the time division multiplexing is reserved as a specific channel for a given communication path. This given communication path may not be shared by multiple devices in a logically simultaneous manner. Consequently the medium which is synchronously divided by the time division multiplexing is to a large extent wasted during idle periods between the different devices or endpoints coupled to the system. Additionally, automatic baud rate recognition and adaptation cannot be accomplished with these types of systems. Specifically, if two devices of different baud rates are attached to the system, the devices must be reset to operate at the same baud rate. However, not all devices are capable of changing their baud rate by way of a software command, which would be necessary for these types of systems to operate. Alternatively, these systems require that all devices connected to the communication bus operate at the same baud rate through some type of special controller card which does a hardware conversion of the incoming and outgoing bit streams to the appropriate hardware at each endpoint.

An alternative to synchronous systems are systems embodying asynchronous division of a communication medium or bus by way of various multiple access techniques, such as used in the Ethernet TM local area network system disclosed in U.S. Pat. No. 4,292,623 to Eswaran et al. The CSMA system disclosed in U.S. Pat. No. 4,542,499 to Bella et al is similar. However, the asynchronous use of communication media raises several problems. Further, a traditional CSMA/CD system such as is contemplated by the Ethernet TM local area network system is limited in the physical length to which the communication media may extend. Ethernet protocols specifically require that the system dimentions be kept under one kilometer. This one kilometer limitation applies to terminal to terminal communication distances, a serious limitation in the modern office environment.

Other prior art systems have used polling techniques in which a central controller sequentially polls each of the remote terminals or end points, offering each an opportunity to access the communication bus when available. In one such system, called a priority request system, remote end points ready to transmit a message make a request, and are granted access to the bus according to priorities established by a bus arbiter at the central controller. However, systems that use the priority request technique require that a significant amount of processing to be done by the central controller.

Other channel access systems such as shown in the Kume U.S. Pat. Nos. 4,538,261 and 4,506,361, use a retransmission mechanism based on a probing of the communication bus to determine if packets have collided on the bus. This technique results in inefficiencies in that individual packets may be retransmitted multiple times before a clear transmission of the packet can be accomplished.

Additionally, a need exists in the modern office environment for communication between terminals or endpoints in a system to access leased T1 channel or X.25 interface in the most expeditious and efficient manner. For these reasons there is at present a need for an improved, modularized data switching system.

SUMMARY OF THE INVENTION

Accordingly, one of the objects of this invention is to provide a novel data switching system and methodology which allows for the asynchronous multiplexing of a synchronously divided physical media.

It is a further object of this invention, to provide a system by which a modular "building block" approach is maintained throughout the entire data switching system wherein multiple devices may be added or removed from the system without penalty.

Yet a further object of this invention is to provide a system by which multiple and varying devices may be added to the system at any point thereby providing for increased modularity within the system.

A further object of this invention is to provide a system and method by which asynchronous terminals or devices of any given speed may be connected to a system and may transfer data to other terminals of the system without regard to the speed at which a given terminal may operate.

A further object of this invention is to provide a system and method by which multiple terminals within a system may be logically connected to external network interfaces, such as T1 or X.25 gateways, with the system providing the automatic switching and packet assembly/disassembly necessary for these types of external networks.

A still further object of this invention is to provide a process and system by which the flow control of data from one terminal endpoint to another terminal endpoint is controlled at the endpoints themselves rather than at the master control or command portion of the system.

Briefly, these and other objects and advantages of the invention are attained by providing at each terminal connect point to the data system a hardware and software mechanism which asynchronously utilize a synchronously divided PCM bus. This asynchronous sharing by many endpoints of each of the synchronously divided timeslot channels on the PCM bus provides a means by which maximum utilization of the bus can be accomplished. Each timeslot channel may be shared by multiple data sessions, and in a combined voice/data system, the common control may assign timeslots for data sessions based on the volume of data traffic in the system. The endpoints themselves may run at various baud rates with packets of data being sent from each endpoint to another endpoint along the PCM bus occurring only on an "as need" basis. This allows the maximum utilization of the bus and each timeslot channel on this bus. The system and methodology of this invention also allows for multiple logical sessions to be provided at a network termination endpoint such as an X.25 gateway thereby increasing the flexibility and power of the system of this invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE DRAWINGS

Figure 1:
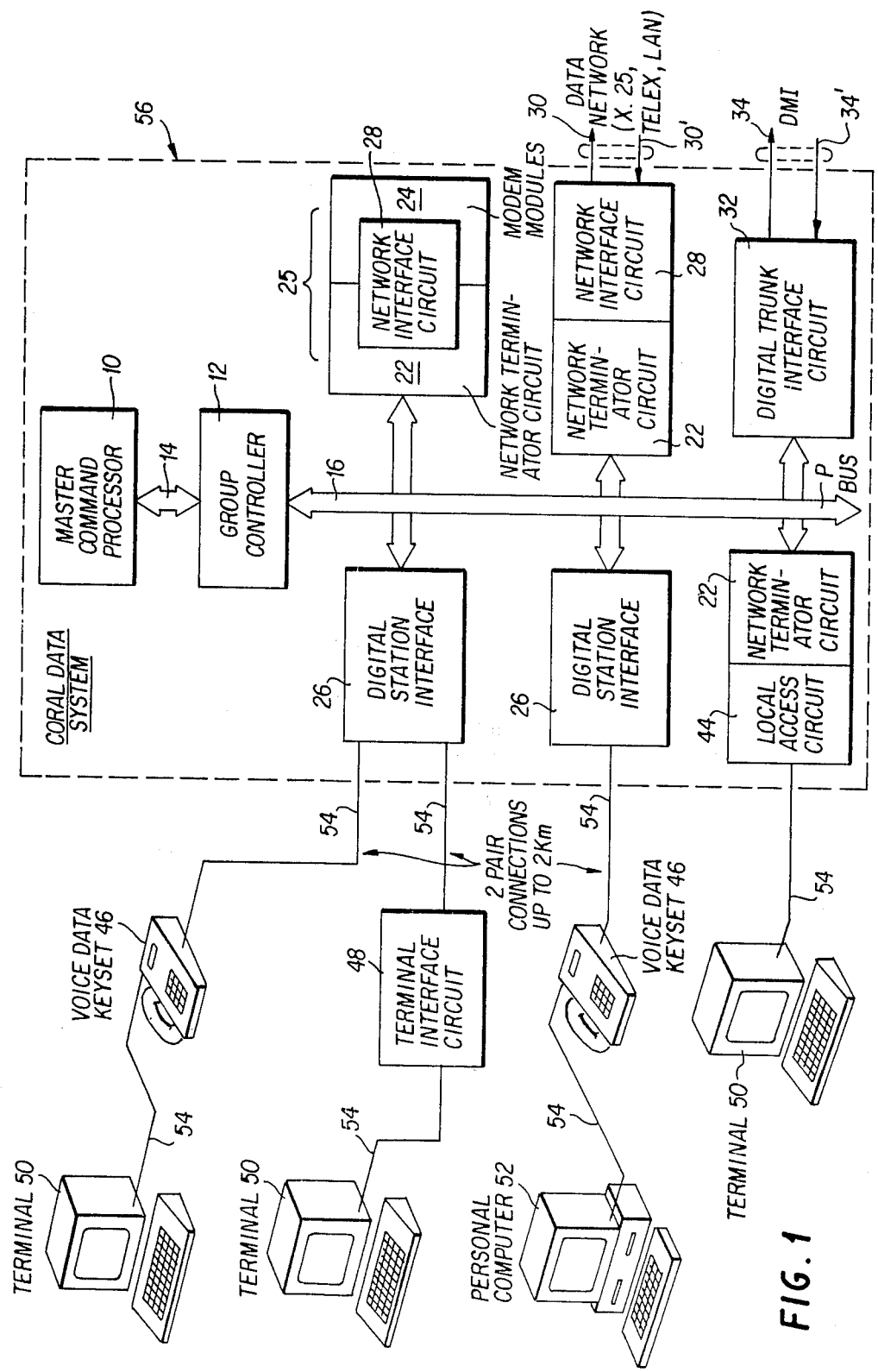
FIG. 1 is a block diagram of a representative configuration of a Data Switching System according to the teachings of the invention.

Referring now to the drawings, wherein like reference numerals designate identical or corresponding parts throughout the several views, and more particularly to FIG. 1, block diagram is shown illustrating a highly flexible modularized data switching system, known as the Coral brand data switching system, to be referred to herein as "the system" or "the switching system". The system is used for switching user generated and supervisory data between different endpoints, as well as to and from external points and the switching system itself. The system can support asynchronous devices with speeds between 110 bps to 19,200 bps, and synchronous devices with speeds up to 64 Kbps.

A Voice Data Keyset 46 (VDK) which will be described in more detail subsequently can be used to connect either asynchronous or synchronous devices to the system. Terminal Interface Modules 48 (TIMs) which operate in the same manner as Voice Data Keyset, although without the "voice" functions may be used in the same manner as Voice Data Keysets to connect these types of devices to the system. Local Access Modules 44 (LACs), can also be used to connect asynchronus devices to the system.

Additionally remote hosts may be connected to the system by way of modem pools 25 or by conventional X.25 gateways which are connected to the system via conventional public switch data networks. Wide area network links via public carriers or private standard T1 carrier facilities are also supported. In addition, terminals or personal computer workstations may access various commercial telex networks via a specialized telex gateway which may be added to the system. By providing full modularity, various configurations and reconfigurations of the system can be easily and inexpensively accomplished to meet the needs of a wide range of potential customers or to accommodate and adapt to the changing needs of any customer.

The system, as descirbed in more detail subsequently, also provides for automatic baud rate recognition of various asynchronous devices which are connected to it. Within the system there is also provided all the speed conversion necessary for asynchronous devices to carry on communication with each other independent of the speed of the individual asynchronous devices. Additionally, the system provides for logical multiplexing on standard, conventional X.25 interfaces, which allows it system to handle up to 32 simultaneous sessions per X.25 interface. Multiple X.25 interfaces may also be used with the system.

Further, the System provides for formatting and multiplexing of data into T1 (1.544 MHz) or CEPT (2.048 MH digital trunks. The AT&T DMI modes 0, 1 and 2 rate adaptation formats are used and supported by the disclosed system.

Referring again to FIG. 1, a representative configuration of the System of this invention is shown, in which a master command processor 10, such as a conventional Intel 8086 microprocessor, functions as the master microprocessor which controls the functional flow of data throughout the entire system. This processor operates under the conventional RMX 86 realtime multitasking operating system from Intel Corp.

FIG. 1 is "representative" in the sense that the System is fully modularized and can be arranged or rearranged in any suitable configuration given various input and output specifications, to meet the changing needs of any particular customer. Additionally, the System shown in FIG. 1 may be reconfigured as the needs of particular customer change over a period of time.

The master command processor 10 plays a special role in system operation. It is a "master endpoint" in that it performs all data call processing functions including connection setup/disconnect, authorization, resource allocation, administration, diagnostics, parameter downloads, and similar functions. The term "endpoint" is used to denote a boundary of the system. The following types of endpoints are hereby defined:

peripheral endpoint—these are data access points which are connected to the system via two twisted pairs. These include Voice Data Keysets 46 or terminal interface modules 48.

local endpoints—these are the local data access points which are directly connected to the system. Representatives of these types of endpoints are the local access interface circuits 44.

network termination endpoints—these are multiplexing endpoints that accept connection with multiple peripheral or local endpoints and act as the interface between the system and an external transmission circuit. An example is a network terminator circuit 22.

wideband endpoints—these are standard T1 or CEPT type multiplexing facilities and are connected to digital trunks or DMI gateways 34—34' by way of a Digital Trunk Interface Circuit 32.

All endpoints, other than the master endpoint, have unrestricted access to the master command processor 10 through a local bus 14 and a peripheral bus 16. It should be understood that any endpoints may communicate with the master command processor 10, or with other endpoints at a given time, depending upon the status of these endpoints. In general terms, the system provides data transmission between various endpoints, according to the requested routing, under the control of the master command processor 10. Attached to each of the endpoints are the actual user terminals, hosts, or external networks.

The master command processor 10 is connected to a group controller 12 via a local bus 14. The group controller 12 provides control instructions for numerous peripheral functions which are performed by various peripheral function circuits such as Network Termination Circuit 22, Digital Station Interface 26, Digital Trunk Interface Circuit 32 and the like. These circuits may have varied functions and are added to the system as the functions which are supported by them are needed, providing an example of the flexibility of this modularized and re-configurable system.

The local bus 14 provides a data path between the master command processor 10 and the group controller 12, permitting data flow in a bi-directional fashion. A peripheral bus 16 connects the various peripheral function circuits to the group controller 12.

The group controller 12 serves to relieve the master command processor 10 of the time critical control of the peripheral bus 16. The group controller serves as a connection mechanism between the various timeslot channel usages of the peripheral bus 16. The peripheral bus 16 is a conventional TDM voice-data highway operating as a conventional 64 timeslot system at a speed of 4.096 megabits per second. Each timeslot on the peripheral bus forms a logical timeslot channel. Each timeslot channel on the peripheral bus 16 may be used for either voice (B1 channel) or data (B2 channel) or a wired "AND" of several B2 channels. The peripheral bus also contains a conventional HDLC bus which is used as a data control channel (D channel) which provides a path for command information within the entire system.

A plurality of peripheral function circuits such as a modem pool 25 or an X.25 gateway, which will be described below, can be connected to the peripheral bus 16, which allow for high speed digital data transmission between the various endpoints connected to the peripheral bus 16, either directly, in the case of network or wideband endpoints, or indirectly, in the case of peripheral endpoints such as a Voice Data Keyset 46.

Figure 6:
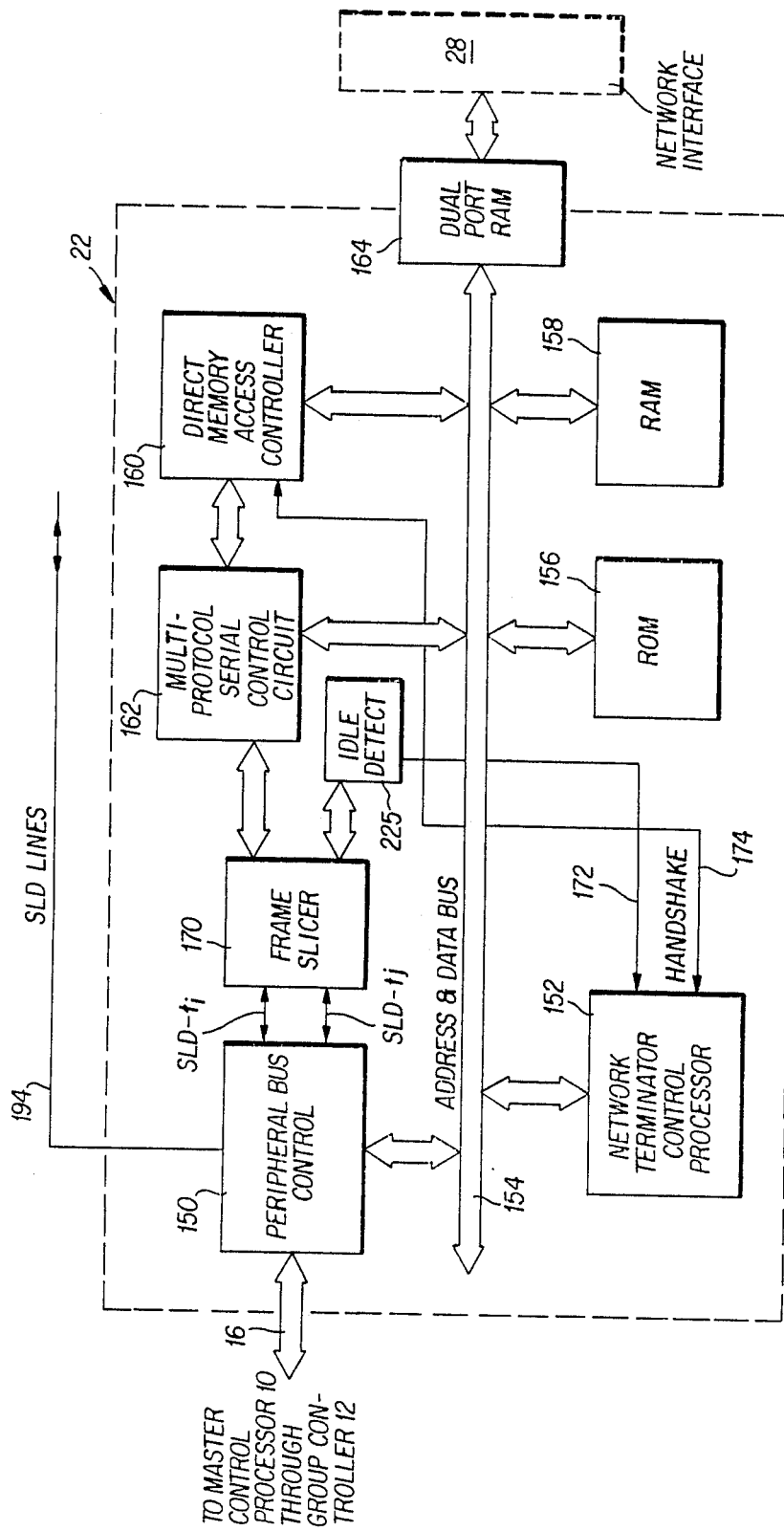
FIG. 6 is a block diagam wherein the basic hardware of a network Terminator circuit is shown.

In a representative configuration, such as is shown in FIG. 1 for example, a network terminator circuit 22, shown in more detail in FIG. 6, provides the necessary control function for operating a modem pool 25 which may be connected to the peripheral bus. The modem pool 25 is shown in more detail in FIG. 7, and contains a plurality of modem modules 24.

Figure 4:
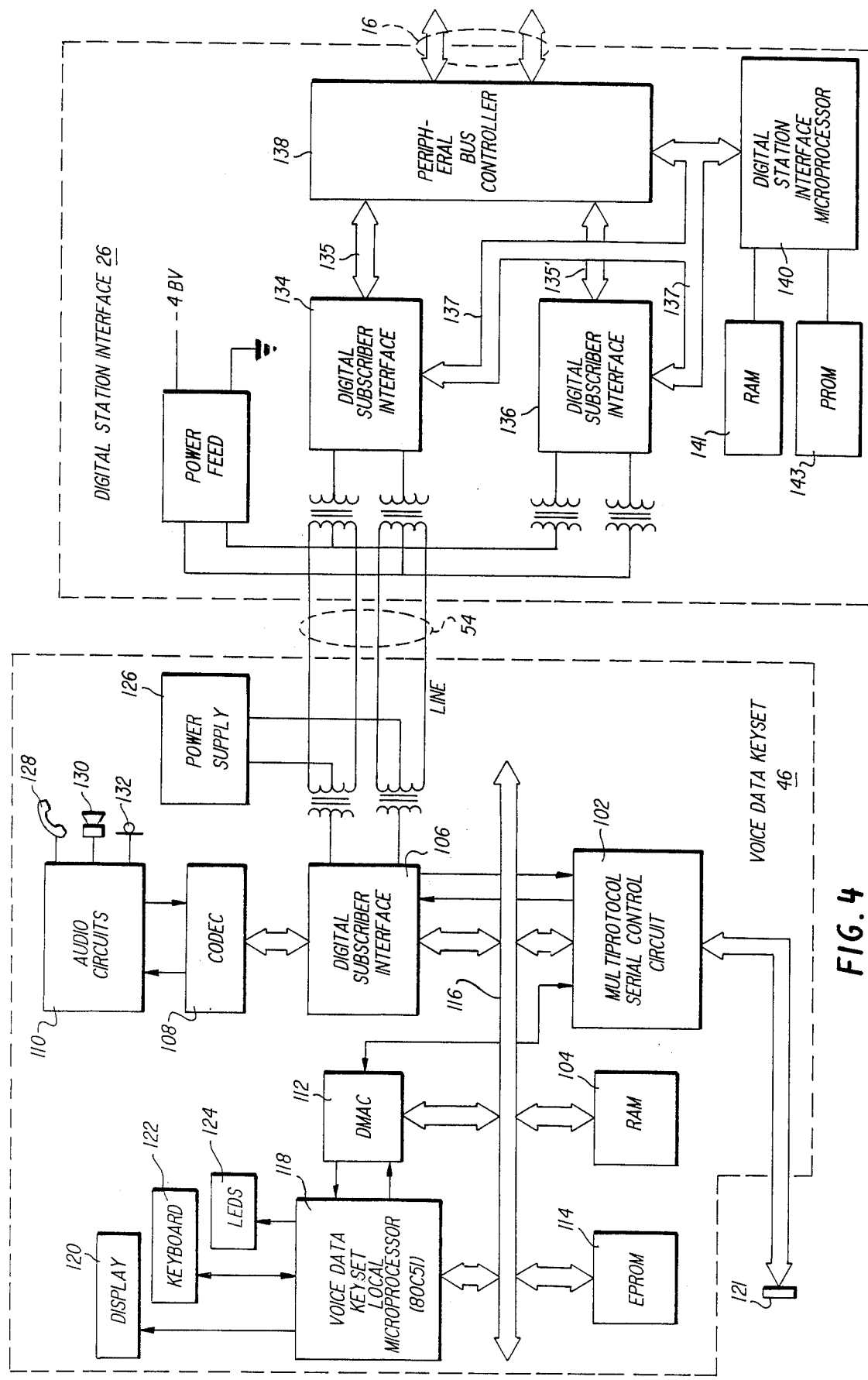
FIG. 4 is a logical block diagram of a Voice Data Keyset and Digital Station Interface and their interconnection.

A digital station interface 26, shown in more detail in FIG. 4, serves as an interface point between a Voice Data Keyset 46 and the system and functions as the connection and interface point for external data sets to the system. Alternatively a terminal interface circuit 48 which acts in a similar capacity as a Voice Data Keyset 46 may be connected to a digital station interface. A terminal interface module 48 functions in the same manner as a Voice Data Keyset 46, however the terminal interface circuit 48, does not support the additional voice functions that are available and supported by a Voice Data Keyset 46, as is shown in FIG. 4 and described in the text relating to that figure.

The digital station interface 26 connects to a plurality of Voice Data Keysets 46 or to a plurality of terminal interface modules 48, each by way of four conductors made up in two pairs of conductors 54 which may be up to two kilometers in length. Each digital station interface may support at least eight Voice Data Keysets 46 or terminal interface modules 48 or any mix of these two devices. The voice data key set 46 provides support for conventional, stand alone "dumb" terminals 50, conventional intelligent terminals (not shown) or a personal computers acting in a terminal emulation mode illustrated at 52. Alternatively, terminals may be connected to the peripheral bus 40 by way of a network terminator circuit 22 and a local access interface circuit 44, as is shown in representative fashion in FIGS. 2a–2d and 3a–3d.

A network terminator circuit 22 would be connected to the peripheral bus 16 in the same basic manner as a Digital Station Interface 26, as will be discussed below with respect to both the physical and software concepts. Connections may also be provided to an outside environment via additional network terminators 22 through modem modules 25 which contain conventional modem pools 24, and described in greater detail with respect to FIG. 7. Further, network interface 28 functions as a front-end into data networks such as a standard X.25 network, standard telex or local area network system through the external data network lines 30—30', as will be discussed with respect to FIGS. 3c, 3d. Additional support is provided for local digital trunks through the digital trunk interface circuit 32. This digital trunk interface circuit 32 provides a high speed communication lines via the digital data lines 34—34' into other high speed data systems.

As mentioned previously the system is a modular or component system which can be configured or reconfigured in virtually any manner required by a customer. A representative configuration of the system, is shown in FIG. 1. Other possible configurations are illustrated in FIGS. 2a through 2d, and 3a through 3d. The block diagram of FIG. 1 may lead to the impression that only asynchronous devices may be connected to a System, but it should be understood by reference to FIGS. 2 and 3 that the system of this invention also accomodates synchronous devices of most types and speeds.

Figure 2A:
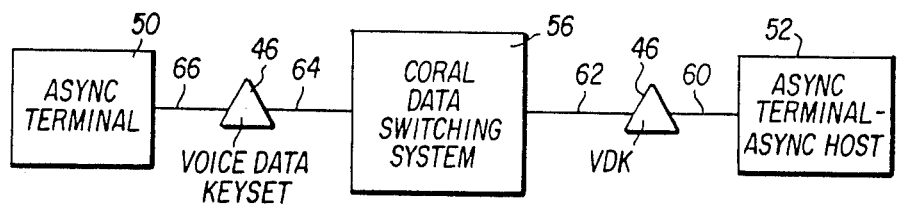
FIG. 2a is a block diagram of a representative asynchronous communication path through the System of the invention.

For example, as shown in FIG. 2a, where the switching system of the invention is designated by a block 56, an asynchronous terminal 50, which may alternately be a conventional personal computer (not shown), or a "dumb" terminal (not shown) may be connected via an asynchronous data line 66 through a voice data key set 46, functioning as the interface point to the system, or through a terminal interface circuit 48 (not shown), which can serve in the alternative as the interface point to the system in the illustrated configuration by way of a synchronous line 64. The connection from a Voice Data Keyset (or TIM) to the system is by way of a synchronous; 256 kbps line. The lines 64, 62, 70, 74, 76 are identical synchronous lines. The illustrated configuration of the system can then pass any information provided by the asynchronous terminal 52, via an additional synchronous line 62 to yet another Voice Data Keyset 46 or to a terminal interface circuit 48 (not shown) which functions as the other interface point to yet another asynchronous terminal 52 or to an asynchronous host computer 58 (not shown).

Figure 2B:
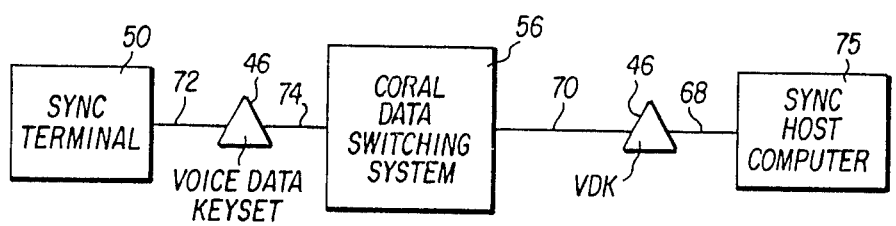
FIG. 2b is a block diagram of another representative synchronous communication path through the System of the invention.

In FIG. 2b an arrangement similar to that of FIG. 2a is shown. However in the FIG. 2b arrangement, the terminal 50 may operate in a synchronous mode, over a set of synchronous data lines 72 coupled to the voice data key set 46, or the terminal interface circuit 48 (not shown), which functions as an interface point connecting the synchronus terminal 52 to the system 56 via synchronous lines 74. This representation of the system provides synchronous communication to a synchronous host computer 75 via another Voice Data Keyset 46 or terminal interface circuit 48 (not shown), which would provide the necessary interface connections and handshaking functions to be described later. It should be readily apparent that a Voice Data Keyset 46 or a terminal interface circuit 48 may operate in either synchronous or asynchronous modes, with either providing any necessary support for these two modes of communication. However, the shared timeslot channel technique of this invention would not be used in the case of synchronous transmission, with each timeslot channel, then being dedicated to each synchronous communication session. Each timeslot channel is however, dynamically allocated and when a timeslot channel is used in an asynchronous mode, this timeslot channel is multiplexed or used for multiple communication sessions as will be described below.

Figure 2C:
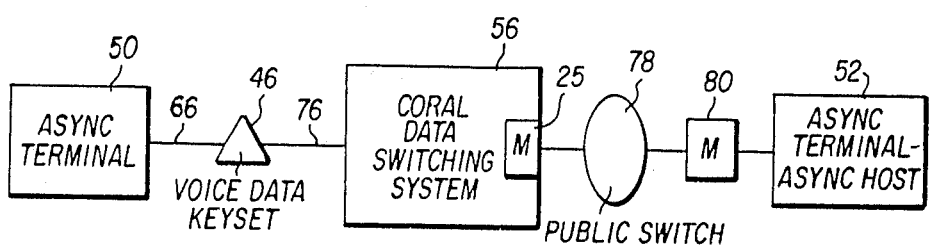
FIG. 2c is a block diagram of a representative asynchronous communication path through the System of the invention illustrating the use of a conventional Public Switched Telephone network.

In FIG. 2c there is shown a further representation of the system where an asynchronous terminal 50, which could be either a PC or a "dumb" terminal, is connected to a voice data key set or terminal interface module 48 by way of an asynchronous line 66. A synchronous line 76 connects a Voice Data Keyset 46, or a terminal interface circuit 48 (not shown), to the illustrated representation of the system, where it is coupled to the modem pool 25, to be discussed in more depth with reference to FIG. 7. The modem pool provides conventional modem signals which are then transmitted out by the system as conventional "voice tones" over a public switch telephone network 78 to a remote host, where they are converted by a conventional modem 80 to provide communication to a asynchronous terminal 52 or asynchronous host 58.

Figure 2D:
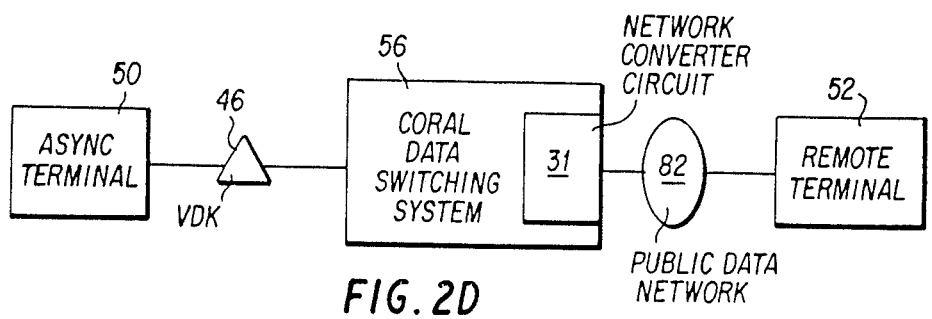
FIG. 2d is a block diagram of a representative asynchronous communication path through the System of the invention illustrating the use of a conventional Public Data Network using Standard X.25 protocols.
Figure 8:
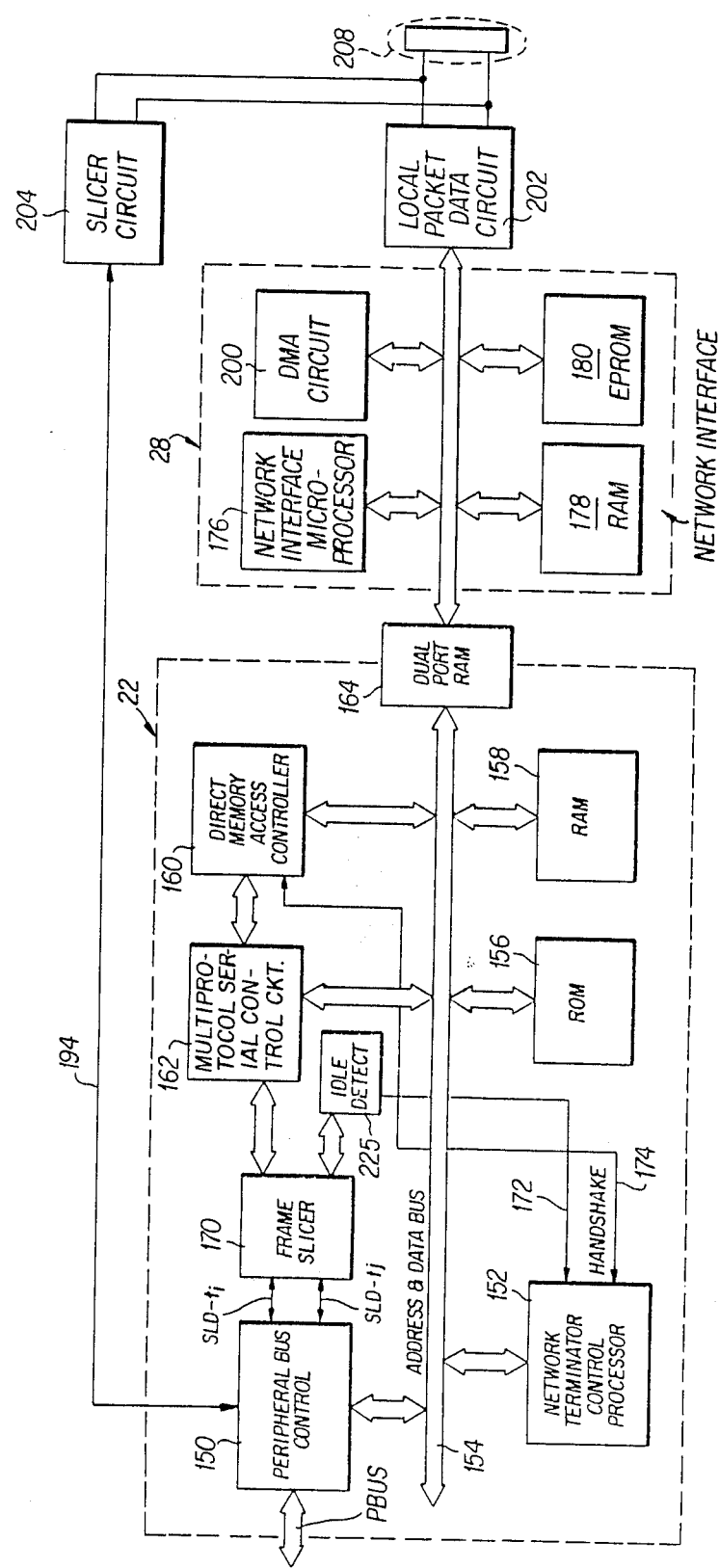
FIG. 8 is a block diagram of a Network Terminator designed to serve as an X.25 gateway.

In FIG. 2d there is shown another representation system which includes the hardware and software necessary to connect an asynchronous terminal 56 via a voice data key set 46 or terminal interface circuit 48 (not shown) through the system to a terminal network converter circuit 31, shown in more detail in FIG. 8, which adds the information required in an external packeting system, to appropriately convert the data stream coming to or from the system. The additional "third" layer necessary for the conventional X.25 protocol conversion of the signal is an example of the function supported by this hardware. The packeted signal provided by the system from the terminal to the network converter circuit 31 is then provided to a conventional public data network 82 and is transmitted from that system to a remote terminal 52 or remote host 58 (not shown).

Figure 3A:
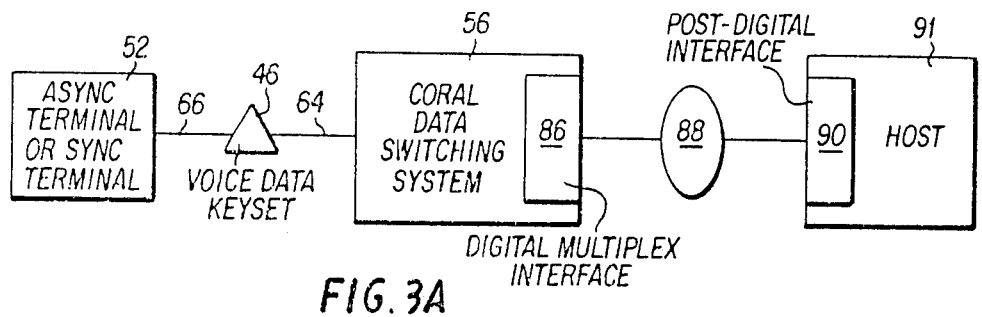
FIG. 3a is a block diagram of a representative asynchronous or synchronous communication path through the System of the invention using conventional leased T1 communication lines for connection to a remote Host.

Referring now to FIG. 3a, an asynchronous or synchronous terminal 52 is connected by a line 66, which may be either asynchronous or synchronous as required, to a Voice Data Keyset 46 or to a terminal interface module 48 (not shown). If a personal computer acting as a "smart terminal" is used, it would be connected only to a Voice Data Keyset 46 rather than to a terminal interface module 48. The converted data of the Voice Data Keyset 46 is then transmitted to the system 56 via communication line 64. When operated in this mode, the voice data keyset 46 or a terminal interface module operating in the same capacity as a Voice Data Keyset acts as a "rate adaptation device" packing the data sent or received from the terminal to a 64 Kbps B2 channel, which is in turn routed to a dedicated timeslot channel on the PCM portion of the peripheral bus 16. Inside this system 56, a conventional digital multiplex interface 86 provides a high speed conversion of the high speed internal signals so that they may be sent over a private digital T1 line 88 in accordance with standard DMI protocols to a remote host 91 for processing. These signals are converted into the proper format needed by the remote host 91 and stripped of the external DMI communication layer by a conventional post digital interface 90 located at the remote host.

Figure 3B:
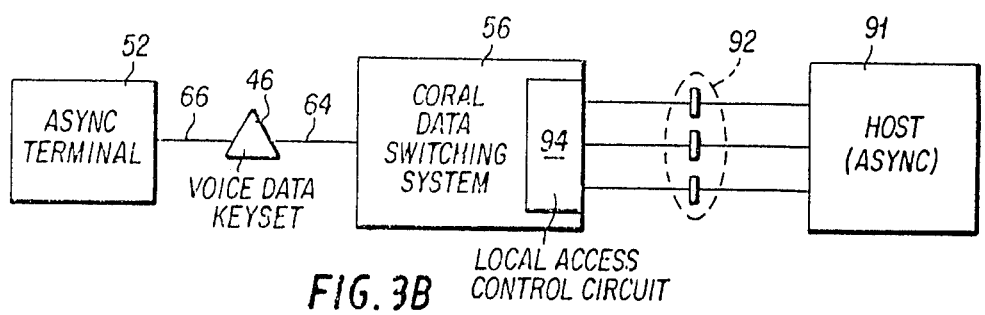
FIG. 3b is a block diagram of a representative asynchronous communication path through the System of the invention providing access to a remote Host by way of asynchronous communication.

Alternatively, as shown in FIG. 3b, an asynchronous terminal 52 may transmit through the communication line 66 to a voice data key set 46 or to a terminal interface circuit 48 (not shown), data which is then packetized as will be discussed below with respect to the Internal Link Access Protocol, and sent to the system 56 via the communication line 64. The system 56 then employs a local access control circuit 94 which converts the Internal Link Access Protocol packetized signals into conventional standard serial communications of the correct baud rate which are sent out over conventional RS232C lines 92 to an asynchronous host 91 for further processing.

Figure 3C:
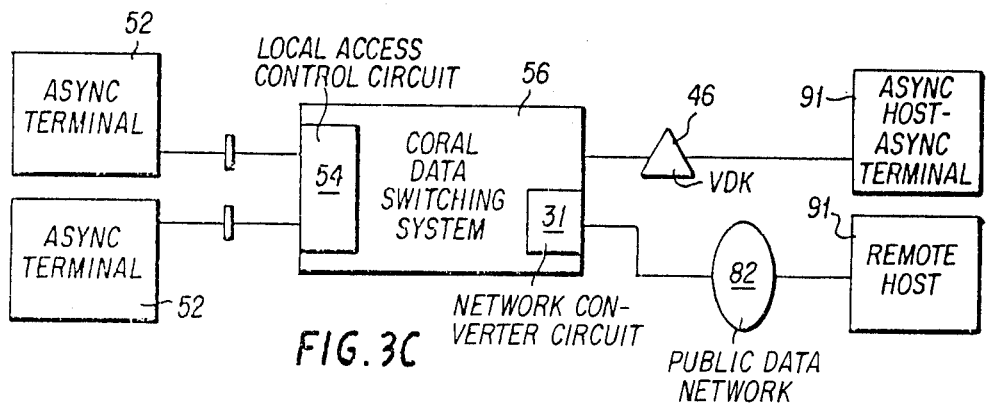
FIG. 3c is a block diagram representative asynchronous communication path through the System of the invention showing multiple asynchronous paths to either a local Host computer or a remote Host by way of a convention Public Data Network using standard X.25 protocol.

In FIG. 3c an asynchronous terminal 52 may be connected through a local access control circuit 94 in the same manner as shown and discussed above with respect to FIG. 3b to the system 56, with the "outgoing" signals being transmitted to either a remote asynchronous host 91 or a terminal (not shown). If the signals to be sent to a remote host 91, by way of a Public Data Network 82 an additional Network Converter circuit 31 is employed within the system 56 to allow the signals to be sent to the remote host by using conventional X.25 protocols.

Figure 3D:
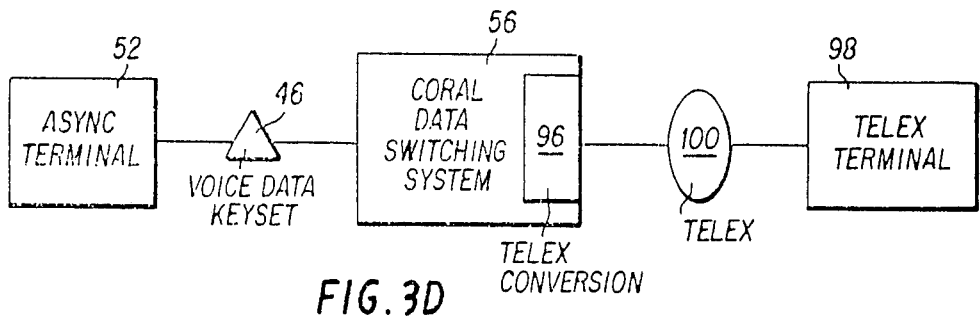
FIG. 3d is a block diagram representative asynchronous communication path through the System of the invention illustrating support of standard telex services.

In yet another configuration of the invention as shown in FIG. 3d, an asynchronous terminal 52 is connected through either a Voice Data Keysets 46 or a terminal interface circuit 48 to the system 56 for providing conventional telex services via a telex conversion circuit 96 which provides communication to a standard telex terminal 98 via standard telex network lines 100.

Packet Switching

The system of the invention employs an internal packet switched data transfer mechanism which is supported by both hardware and software at the various endpoints. The software is structured in three logical levels or layers:

Terminal Interface/Package Assembly/Disassembly (PAD) protocol—Level 3
Internal Link Access Protocol (ILAP)—Level 2
Shared Channel Access Protocol (SCAP)—Level 1.

A hardware layer, which is the Physical Media Interface, is, of course also provided, and is also at Level 1

The Terminal Interface Packet Assembly/Disassembly (Level 3) operates in accordance with the X. 3 CCITT standard, which is hereby incorporated by reference, and which supports:

Baud rate, and format recognition;
Special character recoqnition (escape sequences, etc.);
Echo;
Virtual terminal functions (padding, etc.);
Local editing;
Packet forwarding/reception;
Command recognition; and
Flow control.

This level 3 or Packet Assembly/Disassembly layer is found only in peripheral endpoints such as a Voice Data Keyset 46, local access endpoints and in the Modem Pool. For other endpoints, such as Network termination endpoints, this layer is replaced by another level 3 layer, according to the specific network involved, such as an X.25 layer in an X.25 gateway endpoint or a conventional telex conversion layer when a telex conversion circuit 96 is used.

The Packet Assembly/Disassembly layer provides a logical direct interface to the Internal Link Access Protocol layer in the data transfer mode, and to the Master Command Processor 10 through a portion of the Periphal bus 16 known as the HDLC when an endpoint is in a control mode. The HDLC bus is part of the Peripheral bus 16, but it is separate from the PCM timeslot portion of the Peripheral buses. Only the PCM buses are divided into timeslots; the HDLC bus is a high speed (4.096 Mbps) bus, controlled by the Group Controller 12 that passes information by a polling of the peripheral cards on the HDLC portion of the Peripheral bus. For peripheral endpoints, the data transfer from a terminal through a Digital Station Interface microprocessor (shown at 140 in FIG. 4), which is logically connected to the HDLC portion of the peripheral bus 16, occurs by a command protocol referred to as the 'D Protocol' through a logical "D" channel between peripheral endpoints and the Digital Station Inteface 26. This 'D protocol' is modeled after the conventional HDLC protocol.

The Internal Link Access Protocol or (ILAP) is an endpoint to endpoint link protocol. It provides for:

Point to point packet transfer;
Global packet service;
Multipoint or conference packet transfer;
Logical Transparency to other layers such as the level 3 layer mentioned above;
Error detection and recovery (by retransmission);
Flow control;
Link initialization/reset;
Link disconnect; and,
Address filtering—to support multiple sessions on the same timeslot channel.

The Internal Link Access Protocol is a bit oriented protocol. At least one of the described layers is found in all peripheral, local and network terminator endpoints. As will be described in more detail later, multiple "copies" of such a layer may be present at an endpoint, for example, at a network terminator circuit 22 endpoint. A more detailed description of this protocol or layer is set forth below under the heading "Internal Link Access Protocol".

The Shared Channel Access Protocol (SCAP) or level 1 layer, is a contention protocol for facilitating the transmission of multiple communication sessions between various endpoints on the same PCM timeslot channel. The methodology of this Protocol is supported by the hardware architecture of the system which provides a logically wired 'AND' between all endpoints that are routed through the same timeslot channel at a given time.

One "copy" of the Shared Channel Access Protocol layer is found in all peripheral, local and network terminator endpoints.

In addition, special hardware called the Idle detect mechanism 225, described with respect to the Digital Subscriber Interface circuit in the section headed with that name, and in the Shared Channel Access Protocol section, is used at the various endpoints to monitor the availability of a timeslot channel.

The physical media interface is a sublayer between Shared Channel Access Protocol layer and the hardware or physical transmission media. This sublayer performs the actual interface to the peripheral bus 16.

In peripheral endpoints, such as Voice Data Keysets 46, the physical layer is based on the Digital Subscriber Interface 106 (DSI). In local endpoints and network terminator endpoints, a special frame slicer circuit serves as the physical layer or link to the periheral bus 16's timeslot channel.

Voice Data Keyset Interface

The interconnection and function of a Voice Data Keyset 46 and the digital station interface 26 will now be explained with reference to FIG. 4. A digital subscriber interface circuit 106, whose hardware will be described in more detail later with respect to FIG. 9, operates in a special mode designated as the "master mode". (The mode scheme of the digital subscriber interface will be discussed with respect to FIG. 9.)

Digitized audio or voice signals are provided from a conventional CODEC signal processor 108 (such as a Intel 29C51) to the Digital subscriber interface Circuit 106. The CODEC signal processor receives the audio signal from a conventional audio control circuit 110, which may employ, for example, a hand set 128, a speaker phone 130 and a microphone 132. The digital subscriber interface circuit, as will be described later, provides a path for the digitized voice to be placed on the B1 subchannel of the line to a Digital Station Interface and subsequently onto a timeslot channel of the peripheral bus 16.

One half of a conventional multiprotocol serial controller circuit 102 (such as an Intel 8274) operates as a conventional HDLC controller providing some of the processing and control of the flow of the digital data to and from the digital subscriber interface circuit 106. The digital subscriber interface circuit and the use of the multiprotocol serial control circuit 102 as an HDLC control circuit will be discussed in more detail in the section headed "Digital Subscriber Interface".

The multiprotocol serial controller circuit 102, has access to a RAM memory 104 by way of a conventional direct memory access controller 112 (such as an Intel 8237) A voice data key set local microprocessor 118 (for example, a standard 8051 CMOS chip) provides the internal processing functions necessary to assemble data packets in the internal protocols necessary for communication. These protocols are discussed in more detail in the sections headed "Shared Channel Access Protocol" and "Internal Link Access Protocol". The direct memory access controller 112 and the multiprotocol serial controller circuit 102 are triggered by commands issued by the voice data keyset local microprocessor 118. The local microprocessor 118 is connected to the multiprotocol serial controller circuit 102 by way of a microprocessor bus 116 which provides the necessary path for the flow of data between local microprocessor 118 and the multiprotocol serial control circuit 102.

Additionally attached to this microprocessor bus 116 is an associated RAM memory 104 and the EPROM memory 114 which provides software instructions necessary for the local microprocessor 118 to assemble packets of data in the Shared Channel Access Protocol, the Internal Link Access Protocol, and the conventional Packet Assembly/Disassembly protocol required for communication with an RS 232C port 121 that is connected to the multiprotocol serial control circuit 102 (i.e., connected to the side not used as the HDLC controller as mentioned above). The Packet Assembly/Disassembly protocol is based on the conventional CCITT X.3 definition.

A display 120, a keyboard 122 and light emitting diodes 124 are connected to the Vbice Data Keyset microprocessor 118 and are provided to give visual indications to a user of a Voice Data Keyset 46 of the various states (i.e. status) of the system. The keyboard is used to invoke telephone functions (i.e., dialing, function keys, etc.). A conventional power supply 126 provides power to all components within the Voice Data Keyset 46.

Digital data lines from a data subscriber interface circuit 106 are preferably two twisted wire pairs 54, which as previously mentioned, and can be up to 2 km in length. These lines are fed to a separate and additional data subscriber interface 134 in the Digital Station interface 26 which is identical in structure to the digital subscriber interface 106, except that this digital subscriber interface circuit is operating in the "slave mode" described in more detail below. The Digital subscriber interface 134 is connected to one of the SLD lines 135 of a conventional peripheral bus controller 138, such as an Intel iATC 2952 or a Siemens PEB 2050 (note that Siemens refers to SLD lines as SIP lines), providing access to the peripheral bus 16. A digital station interface microprocessor 140 with an associated RAM 141 and EPROM 143 supplys the necessary recognition and control functions for the digital subscriber interface 134 to provide the D subchannel control information coming to or from the peripheral bus 16 to the peripheral bus controller 138. Multiple digital subscriber interfaces, such as 134 or 136, may be provided and are all connected to the same peripheral bus controller 138 through the respective plurality of individual SLD lines shown representatively as 135 and 135' of the peripheral bus controller 138. D subchannel control information, both input and output from a Voice Data Keyset or Terminal Interface module, is provided by the digital subscriber interface through the input and output parallel bus 137 to the Digital Station Interface microprocessor 140 which then passes the information on to the group controller on the HDLC portion of the peripheral bus. The multiple digital subscriber interfaces within a Digital Station Interface, which may be provided, allow for increased use of the peripheral bus 16 thereby increasing the flexibility and power of the system by allowing the system to be configured or reconfigured to a particular customer's needs. As a digital subscriber interface may operate in the range of 64 kbps, with the peripheral bus controller being capable of handling over four megabites per second, the transmission rate on the peripheral bus's 16 PCM highway 142, it is clear that in the system of this invention the capability of time slicing or multiple use of the PCM highway 142 is accomplished by way of the peripheral bus controller 138. This time slicing, or multiple session use, of the PCM portion of the Peripheral bus 16, allows for multiple digital subscriber interfaces, such as 134 or 136, to be connected to a single peripheral bus controller.

The time slicing and software control of the digital subscriber interfaces to the peripheral bus controller is accomplished by way of the peripheral bus controller in a conventional 64 timeslot channel arrangement by the Group controller 12 (shown in FIG. 1) under the command of the master command processor 10. As stated above, a plurality of digital station interface circuits 26 or other endpoints, may be provided on the peripheral bus 16 to meet the ever changing needs of a customer. Additionally a shared timeslot channel method of communication is used to further enhance the bandwidth utilization of the PCM highway of the peripheral bus 16. Each timeslot channel may operate at a rate of 64K bps. In the system, more than one of these PCM highways having multiple timeslot channels can be assigned to carry user data. Multiple PCM data highways, each of which has multiple timeslot channels which are operating at a logical 64Kbps speed, may be incorporated into the system, if required by increased customer need. By allowing multiple PCM data highways to be connected to the system each with multiple timeslot channels in which each timeslot channels are multiplexed using the Shared Channel Access Protocol discussed below, the planned obsolescence of prior art systems is eliminated. By allowing the flexible expansion of a system through the addition of PCM highways and therefore additional timeslot channels, the system may be conveniently expanded.

Shared Timeslot Channel Operation

In a shared timeslot channel set-up, two or more pairs of data endpoints are involved. Each pair is virtually connected through a timeslot channel using the Internal Link Access Protocol scheme, discussed in more detail subsequently. Each endpoint within the system, whether a local endpoint, network terminator endpoint or peripheral endpoint, has a separate transmit and receive mechanism. The separation of the transmit and receive mechanisms is maintained in all layers within the system including the physical layer. In the shared timeslot channel arrangement of this invention, all endpoints communicating through a given timeslot channel transmit and receive along this same shared timeslot channel. This makes each timeslot channel a half duplex medium in that only one transmission can take place on it in a given moment. Due to the use of this principle of communication, each endpoint receives the transmission of all other endpoints including itself. Therefore each timeslot channel can be literally or logically modeled as a "single wire" 64 kbs channel with all endpoint transmitters and receivers being connected to this as a "virtual" channel.

The base throughput on each timeslot channel is 64K bps or 1/64 of the 4.096 mbit PCM bandwith. More than one transmitter may have access to a timeslot channel at the same time with arbitration of use of each of the shared timeslot channels being performed by way of a software contention resolution method (the Shared Channel Access Protocol), discussed below.

Additionally, it should be noted that a propagation delay is an inherent property within the system of this invention. This propogation delay is caused by the transmission switching mechanism itself (at the physical or hardware level) and is additionally introduced due to the "timeslotted" nature of the architecture of the transmission system. All transmissions and switchings are confined to a 125 microsecond transmission frame and each multiplex/demultiplex operation or format change within the system introduces approximately one transmission frame of delay.

Data Collision and Collision Avoidance

Figure 5:
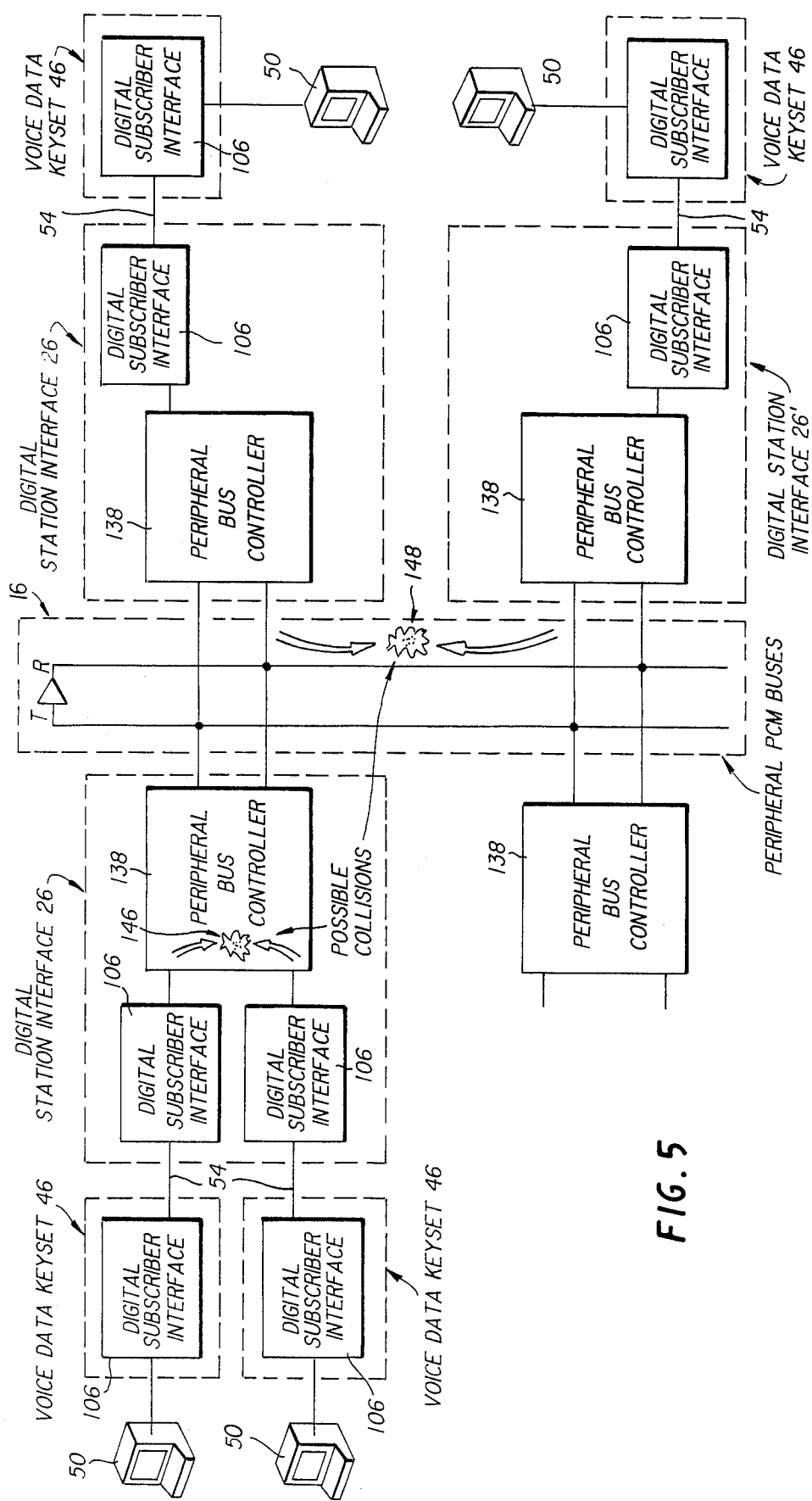
FIG. 5 is a logical block diagram of the contention resolution principles and points of this invention.

Due to the time slicing that is being performed on each timeslot channel of the PCM and the shared use of these individual timeslots of the PCM highway, possible collisions may occur with respect to the multiplexing or multiple use of a timeslot channel. Various possible types of collisions are illustrated in FIG. 5, where a collision for a given timeslot channel ($t_i$) may occur at a single peripheral bus controller 138, which is attached to the PCM data highway. More specific details with respect to this collision detection and abordance are discussed with respect to the Shared Channel Access Protocol section below. The material contained in this section is by way of an overview of the hardware and software interface of this invention.

Each of the peripheral bus controllers 138, which access the PCM highway of the peripheral bus 16, acts as an "open collector" device. Therefore, if two peripheral bus controllers 138 would access the PCM bus during the same timeslot channel ($t_i$), the resulting signal would be the logical AND of the two signals involved. A clear transmission of the signal can therefore be accomplished if, and only if, any multiple transmitters other than the transmitter that is currently using the channel for "useful" data, which are accessing the same timeslot channel transmit transparent characters. That is transmitters accessing the same timeslot through the same peripheral bus controller 138, or from different peripheral bus controllers either connected to the Voice Data Keysets 46 or in other endpoints such as a Network Terminator 22, must provide that any idle endpoints transmit transparent characters over the interface. This is also true with respect to other devices using the same timeslot ($t_i$) which are connected to the PCM highway of the peripheral bus 16. For clarity, only Voice Data Keyset to Voice Data Keyset communication is shown in FIG. 5, however the same contention resolution principles of this system which discussed below applies to Vbice Data Keyset 46 to Network Terminator 22 communication or other types of communication within the system. The specific transparent character used are FFH, Hexadecimal FF or 8 logical "1"s, which when ANDed with any other character, result in the original character.

In the shared timeslot channel concept as contemplated by this invention, all endpoints which use a same shared timeslot channel transmit and receive along this same shared timeslot channel. Each endpoint has a unique I.D. or address that is assigned to the individual endpoints at the beginning of a data transmission session. Only one transmitter on a given timeslot channel may transmit at any given moment. All other transmitters on this timeslot channel must send the transparent characters whenever they are idle or waiting for the channel. If more than one transmitter needs to access the same shared channel at the same time, arbitration is performed by way of a Shared Channel Access Protocol discussed below. All digital subscriber interfaces 106 contained within the Voice Data Keysets 46 connected to this shared timeslot channel receive and monitor this shared timeslot channel. However, each digital subscriber interface 106 in the Voice Data Keyset 46 only recognizes and uses packets which are addressed to it by way of the unique I.D. code assigned to that specific digital subscriber interface. Packets not properly addressed are ignored.

Each endpoint may reserve the timeslot assigned to it by the use of a timeslot channel monitor mechanism by monitoring the timeslot channel assigned to it and its peer by MCP on the PCM highway to determine if this timeslot channel is active or inactive. If the endpoint detects that the timeslot channel is not active, no deference to the active timeslot channel is given but rather the endpoint attempts to reserve the use of the timeslot channel of the PCM highway. If this monitoring check of the timeslot channel of the PCM highway shows that the timeslot channel is free, a reservation method is used to eliminate the undetectable collisions that could occur due to the natural propagation delay that occurs within the system. The reservation method uses transmission of a special reservation character (rc) which is unique and assigned to each transmitter. The reservation character propagates throughout the entire system on the particular timeslot channel involved. The endpoint that wishes to reserve the system awaits its return uncorrupted on this same timeslot channel. If the character is received uncorrupted on the timeslot channel, the endpoint knows that the particular timeslot channel is then reserved for that particular endpoint to send a data packet.

If a timeslot channel has been reserved by an endpoint, after the propagation delay interval of signals sent to all endpoints, all endpoints sharing this same timeslot channel will store in an internal software register an indication that this timeslot channel is reserved by another endpoint and all transmitters attempting to access this timeslot channel will face a simple deference. The reservation indicator is held only for a time which is defined as the bridging period. It is required that the bridging period be greater than the time necessary to propagate a signal to all endpoints on the timeslot channel. The bridging period is assumed to be uniform throughout the entire system and is set to be the longest possible propagation time.

If, however, a second endpoint tries to reserve the channel during the propagation of the reservation character from the first endpoint, a delayed deference will be necessary. The collision that consequently occurs due to this will be resolved by the fact that the reservation character, of the first endpoint would arrive first at all receivers, including the second receiver, which has sent out its reservation character, but as yet not received its own reservation character. The second endpoint which has received the reservation character of the first endpoint prior to the receipt of its own reservation character will then be required to "back off" or have a delayed deference to the first endpoint. Its transmission will then be rescheduled using a separate algorithm, discussed below in more detail.

The collision detection that is used in this invention is based on the fact that each Voice Data Key Set 26 or other endpoint employs its own idle detect mechanism 225 (shown in FIG. 9) to monitor the activity on a timeslot channel prior to its attempt to transmit data. Therefore, it is clear that both the transmit function and the receive function must utilize the same timeslot channel of the PCM highway, in this invention, with respect to almost all endpoints. A special case exists with respect to the "channel hopping" of network termination endpoints and will be discussed in more detail in that section. This idle detect monitoring detects strings of the transparent (idle) characters sent on a shared timeslot channel used by the endpoints connected to the PCM highway when the endpoint is idle. This idle detect monitoring function, when a voice Data Keyset is involved, is performed by an Idle detect mehanism 225 within a digital subscriber interface 106 (shown in FIG. 9), contained within a Voice Data Key Set 46. This idle detect mechanism provides to the transmitter portion of the digital subscriber interface 106 information as to whether the shared timeslot channel is in use and therefore unavailable for transmission. The exact operation method of the idle detect mechanism is discussed later in the section on the Digital Subscriber Interface. A similar mechanism is used at other endpoints, such as a Network Terminator 22.

System Input and Output

Connection of the system 56 to the "outside world" may accomplished through a network terminator as shown at 22 in FIG. 6. The network terminator is a special endpoint in the system that is able to support up to 32 logically simultaneous sessions with other peripheral or local endpoints as discussed earlier. The network terminator 22, is an integral part of each data gateway or network interface circuit 28, and it interfaces directly with the network interface that handles the function necessary for connection of the System 56 with conventional data networks, such as a modem pool shown in FIG. 7 or the X.25 data network as shown in FIG. 8.

The Network terminator 22 will now be further explained with reference to FIG. 6. In this figure, the high speed data is transmitted via bus 16 (under the control of the group controller 12) to a peripheral bus controller 150 (such as a conventional Intel iATC 2952 or a Siemens PEB 2050) on a dedicated timeslot channel ($t_i$). A network terminator control processor 152, which may be a conventional Intel 80C51 microprocessor, is connected to an address and data bus 154. This bus 154 serves as a data path inside the network terminator for data sent or received by the network terminator 22 (along the bus 16) by way of the peripheral bus controller 150. The frame slicer 170 separates the data on the SLD interface (which is bidirectional) to two separate directions, to interface with the Multiprotocol Serial Control Circuit 162. The Multiprotocol Serial Control Circuit recognizes a packet boundry (in the inbound direction) and in cooperation with the Direct Memory Access Controller 160 deposits these packets in a RAM 158. The Multiprotocol Serial Control Circuit 162 also builds any HDLC (ILAP) frames (in the outbound direction) while pulling information from the RAM 158, with the help of the Direct Memory Access Controller 160. The Multiprotocol Serial Control Circuit 122 separates packets of up to 32 simultaneous sessions that are coming from other peripheral or local end points. The Multiprotocol Serial Control Circuit takes the individual data packets sent to the Network Terminator along the Peripheral bus 16, and separates them into individual data packets and stores them into a random access memory 158 under the control of a Direct Memory Access Controller 160. When a packet is ready for sending for further processing in order to be placed in the appropriate protocol for the outside world, the Direct Memory Access Controller 160 under command of the Network Terminator Control Processor 152 places the data in a dual port RAM 164 and signals the Network Interface 28 that data is ready. Conversely, when data is received from the outside world by the network interface 28, this data is placed in the dual port RAM 164. When an entire packet is complete, the Direct Memory Access Controller 160, again acting under the control of the Network Terminator Control Processor 152, transfers the data to the RAM 158. When the Data is in the RAM 158, the Network Terminator Control Processor is "informed" and the appropriate Internal Link Access Protocol and Shared Channel Access Protocol procedures for that data session are activated. The data is then sent out on the peripheral bus 16 according to the procedures set forth in the Internal Link Access Protocol and Shared Channel Access Protocol. An Idle detect mechanism 225 monitors the Shared timeslot channel's activity, in the same manner as the idle detect mechanism 225 in the Digital Subscriber Interface which is discussed below with respect to FIG. 9.

Figure 7:
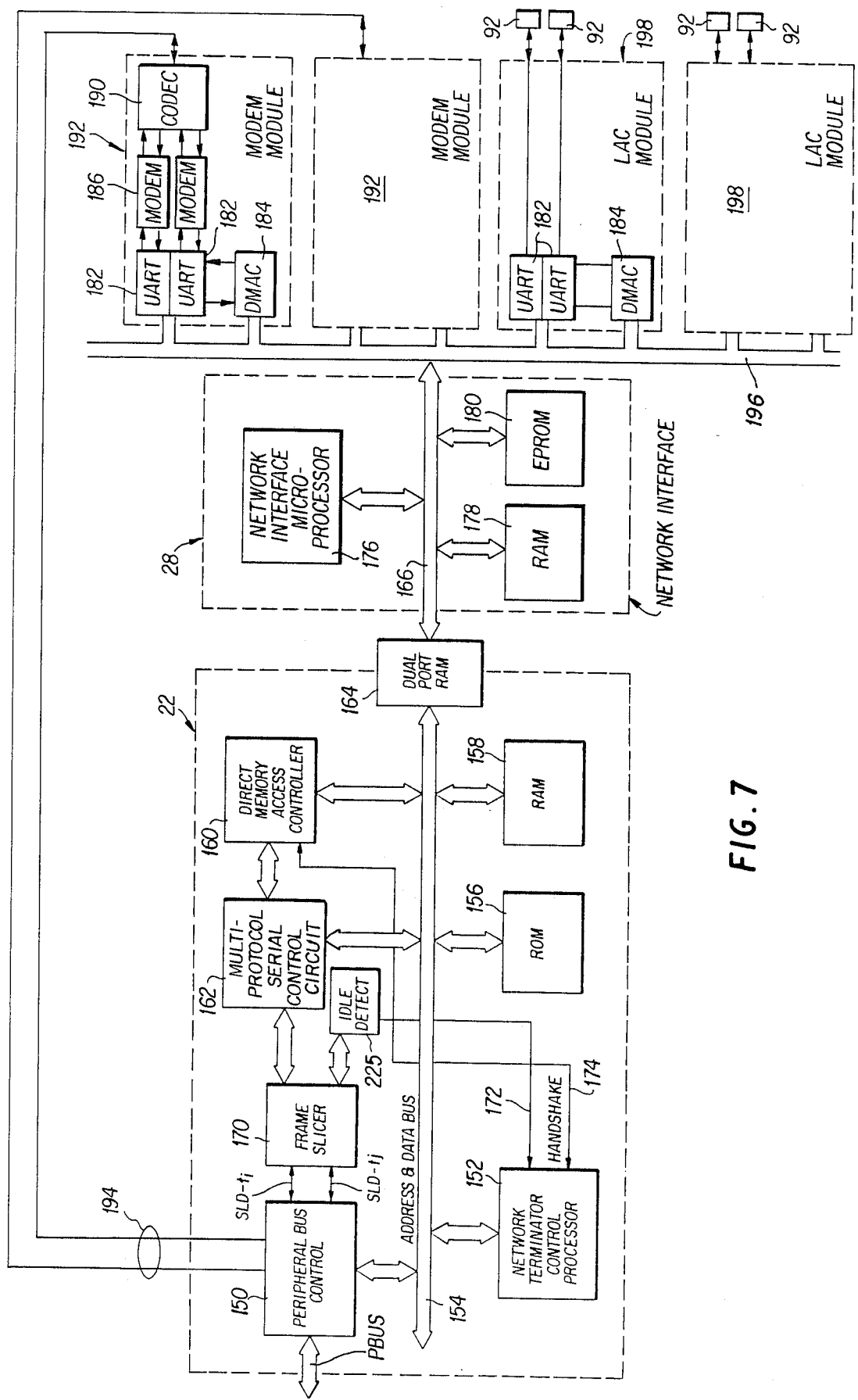
FIG. 7 is a block diagram of a representative Network Terminator illustrating Modem support.

Additional access to the peripheral bus 16 in the form of a separate channel access is provided by a second SLD line 194 attached to the peripheral bus controller 150 connected to a separate timeslot channel ($t_k$) The peripheral bus controller 150 in the network terminator circuit supports multiple SLD lines as shown in FIG. 7.

Channel Hopping

A Network terminator, as described above, operates on a dedicated timeslot channel ($t_i$) so that the 32 logical sessions can be accommodated. It would be incapable of communicating directly with another network terminator insomuch as a timeslot $t_i$ is dedicated for that network terminator endpoint. Communication between Network terminators is provided by a methodology known as channel hopping. The channel hopping operates by using one of the additional SLD lines on the peripheral bus controller 150. This allows each Network terminator to have a logical receiver which may simultaneously monitor two different timeslot channels ($t_i$) and ($t_j$). As 32 simultaneous sessions may be coming in at any given time on the timeslot channel $t_i$, the Network terminator cannot disable its receiver from the timeslot channel $t_i$ and must have an additional receiver able to monitor timeslot $t_j$ so that communication to another Network terminator circuit can be accommodated. When a Network terminator must communicate with another Network terminator endpoint, the transmitter portion of its peripheral bus controller circuit 150 is told to "tune" to the timeslot channel $t_j$ that is dedicated to another network terminator. Then following the procedure set forth below with respect to the Shared Channel Access Protocol, it transmits any messages necessary to the other Network terminator on the second Network Terminator's dedicated timeslot channel ($t_j$). This allows communication between the two Network terminators while still maintaining a communication path for the 32 simultaneous sessions on timeslot channel $t_i$. The Network terminator 22 may, therefore, be modelled as having two separate receivers, one operating on a dedicated timeslot channel $t_i$ and another operating on a different timeslot channel $t_j$ (which may vary). However, as will be discussed below with respect to the idle detect mechanism of FIG. 6, no timeslot channel history will be provided to the newly tuned timeslot channel $t_j$ and therefore a bridging period must be completed before it can be assumed that the timeslot channel $t_j$ has been idle.

The operation of terminator 22 in conjunction with various network interfaces, such as a modem pool 25, is shown in FIG. 7. The modem pool 25 may also serve as a local access endpoint through which a terminal or host may be connected directly to the system, through a standard RS232C interface. A device connected to the system by way of an RS232C interface may be up to 50 feet from the system in accordance with the conventional RS232C standard. In this arrangement, the system supports asynchronous terminals and asynchronous host computers at up to speeds of 9600 bps.

Referring again to In FIG. 7, a dual port RAM 164 of the network terminator is connected to a network interface 28 via a shared data and address bus 166. At appropriate intervals, there is an indication that a full packet data has been placed within the dual port RAM for the network interface 28 to process and forward to the modem module 192. The network interface microprocessor 176, under the control of the program stored in the RAM 178 and EPROM 180, removes the information from the dual port RAM 164 and forwards the data along the network interface communication bus 196 in whatever format or protocol (level 3) necessary for the appropriate type of endpoint involved. Inside each modem module there are universal asynchronous receive and transmit chips (UART) 182 which are used to convert the signal sent along the network interface communication bus 196 to an asynchronous signal which is then fed to a conventional modem 186. Each modem module may contain multiple UARTs which are fed data from the network interface communication bus 196 under control of a direct memory access controller 184. This allows high speed communication to each UART 182 thereby freeing the network interface microprocessor 176 from the need to individually send each set of bits to the UART 182. The SLD lines 194 provide a voice type link back from conventional modems 186, which provide a path for the voice type tones produced by the modems, by use of a CODEC 190 (Intel 29C51) to be fed back to the peripheral bus controller 150 in the Network Terminator to be handled as voice channel information. This provides the link back to the outside voice side of the System, and through conventional analog telephone trunks to the public telephone network, remote modem and remote host or terminal.

The UARTs 182 in the modem modules may also directly drive an RS232-C link 92 as shown at the local endpoint connections 198. The direct connection of the UARTs 182 to an RS232-C link 92 is provided if local terminals are to be directly connected to the System. Standard RS232-C conventions would, of course, then apply and the distance which the terminal may be placed from the System would be limited to the standard RS232 C length.

X.25 Gateway

In FIG. 8 the hardware necessary for the system to operate as an X.25 gateway is shown. The X.25 standard provides a means by which data terminal equipment (DTEs) or data circuit terminating equipment (DCEs) may operate in a packet mode on public or private data networks. This X.25 gateway coupled to the System provides a means by which the System may be used in various countries adopting the standard X.25 public data network standard, which provides for packet switching in data transmission service. By providing this standard X.25 interface the System has provided a means by which international internetworking is possible. Terminals or PC workstations which are connected to a system through Voice Data Keysets 46 or terminal interface circuits 48 may access a packet switched public data network (e.g. PDN's 208) through the network terminator 22 and an associated network interface 28. User data is internally packetized within the system and therefore the X.25 gateway does not need to perform the packetizing of the transmitted data or disassembly of received data. Packets arriving through the network terminator circuit 22 from users of the systems are put into the conventional X.25 packet level protocol (PLP) format by the network interface 28 and sent to the X.25 level 2 data circuit 202 which interfaces to the X.25 network 208. In a similar manner the X.25 level 2 data circuit 202 receives frames of information according to X.25 protocols arriving from the X.25 public data network 208. These are then deframed by this local packet data circuit 202 and transferred to the network interface 28, which strips the X.25 packet level protocol header. The packets are then sent to the appropriate endpoint within the System through the network terminator circuit 22 according to the procedure set forth below with respect to the Internal Link Access Protocol and the Shared Channel Access Protocol. Initial and final packet assembly and disassembly occurs only at the endpoints. Data transfers between the network interface microprocessor 176 and the network terminator 22 are accomplished by way of a direct memory access control circuit 200.

This arrangement of the network interface microprocessor 176 along with the dedicated timeslot nature of the Network terminator 22 allows for up to 32 simultaneous logical transmission sessions, as previously mentioned, meaning that up to 32 terminals may be logically connected to each X.25 public data network at any given time. External synchronous modems (not shown) may be required for operation if voice grade leased lines are used to connect the System to the public data network.

Additionally, the X.25 gateways may also serve to support a private network of multiple systems according to the invention. If operated in this mode, the physical communication layer employs a timeslot on a conventional leased T1 link, which operates at 56K bps in the same manner as a conventional V.35 interface. A network terminator 22 and network interface 28 feed the data stream to a standard X.25 level 2 data circuit 202 (such as the Western Digital 2511 chip) in the same manner as discussed above. This X.25 level 2 data circuit 202 adds the second layer of a standard X.25 protocol, such that individual X.25 data packets, provided and inserted by the slicer circuit 204, may be then sent or received over a dedicated timeslot channel. The slicer circuit receives and transmits data from the network terminator 22 on a separate timeslot channel using one of the unused SLD lines 194 of the peripheral bus controller 150. This is accomplished in the same manner that voice frequency modulated data from the modem pool 25 is transmitted and received on an additional B1 subchannel from the network terminator circuit in the Modem Pool Circuit, but rather on a B2 subchannel of a different timeslot channel. A network interface 28 is then used to provide the third layer of the standard X.25 line protocol allowing for standard communication in accordance with this conventional protocol.

Digital Subscriber Interface

Figure 9:
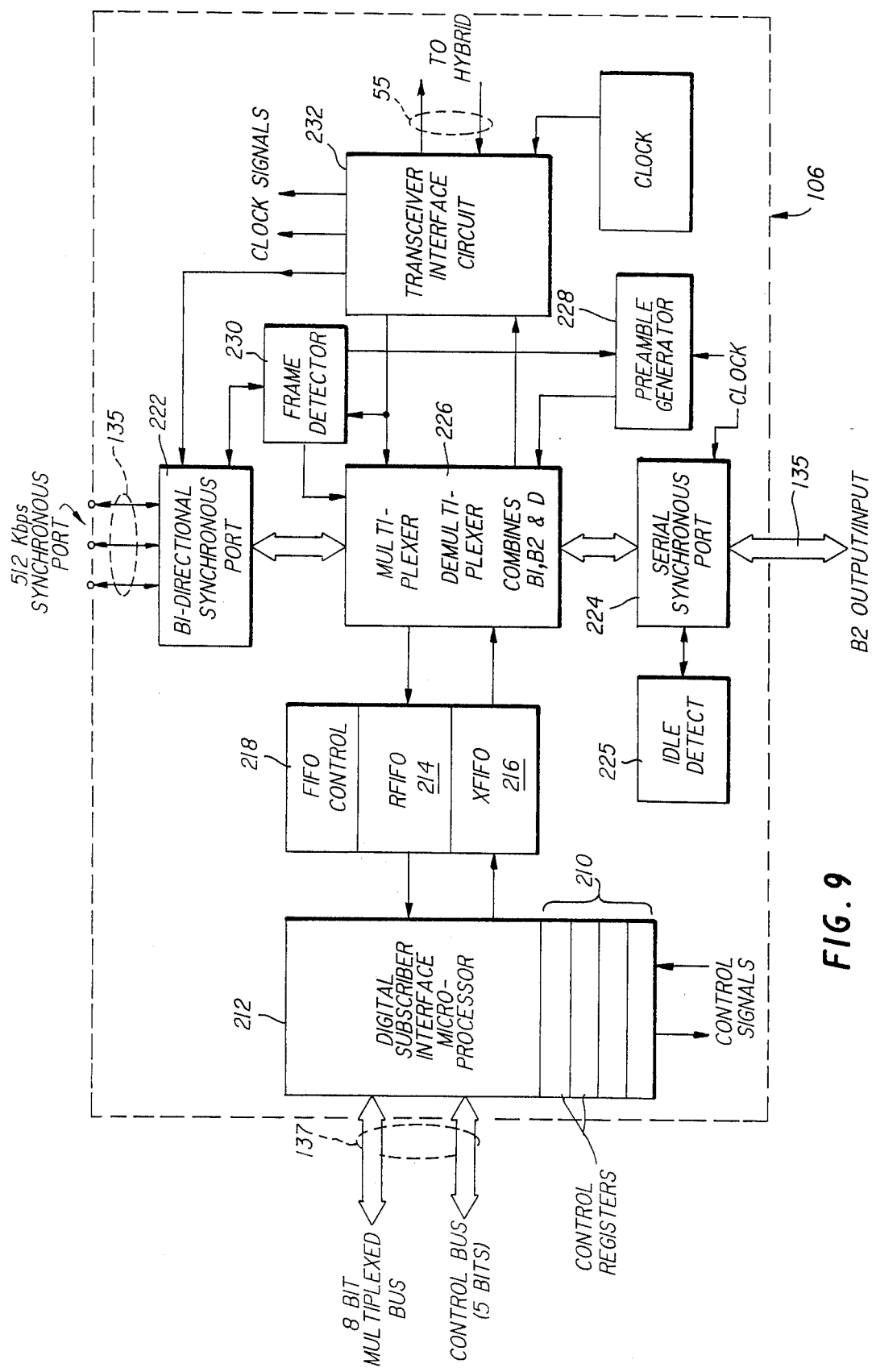
FIG. 9 is a logical block diagram of the Digital Subscriber Interface of the invention.

As shown in more detail in FIG. 9, the digital subscriber interface circuit 106 shown in FIG. 4 implements as a subsystem a point to point tansmission method for data throughout the system allowing simultaneous delivery of voice, data and supervision signals between a Voice Data Keyset 46 terminal endpoint and a digital station interface 26 connected to the peripheral bus 16. This subsystem is implemented in the preferred embodiment as a compact customized VLSI logic chip. The digital subscriber interface circuit provides a net throughput of 192 kbps for loop lengths of up to 2 km, formatted into two 64 kbps channels (B1 and B2) along with a 64 kpbs signaling channel (D channel).

The digital subscriber interface circuit 106 may be connected for use at either end of a communication loop between a Voice Data Keyset 46 and a Digital Station Interface 26. In order to support this function, the digital subscriber interface logic chip 106 can be programmed to operate in two modes, namely the master or slave modes, as briefly mentioned above, by way of an appropriate bit setting in control register 210. This control register is written by its associated digital station interface microprocessor 212 and determines in which mode the digital subscriber interface operates. The digital subscriber interface 106 would be in the master mode when it is resident at a voice data key set 46 or in other words at a terminal equipment endpoint. The internal clocks and line transmit frames of the data stream are locked to the receive bit stream/frame by way of a conventional dual mode digital phase lock loop circuit (not shown) which is contained within a Transceiver Interface circuit 232 in both modes of operation. The digital subscriber interface therefore is controlled by the serial input/output interface between the voice data key set 46 and the opposite digital subscriber interface contained within a Digital Station Interface 26.

The digital subscriber interface is in slave mode when resident at a Digital Station Interface with the clock and frame timing supplied externally. The conventional dual mode digital phase lock loop mentioned above contained within the Transceiver Interface circuit is provided to regenerate the exact phase only of the incoming bit stream when a Digital Subscriber interface is resident in a Digital Station Interface as the frequency information is provided by the peripheral bus controller to which the Digital Subscriber interface would be connected to in a Digital Station interface (see FIG. 4). When resident in a Voice Data Keyset 46 the dual mode phase lock loop must regenerate or regulate not only the phase of the clock signal but also the frequency of the clock signal. When power is initially switched on, the default mode of a digital subscriber interface logic chip is set to perform in the slave mode. Therefore, the first operation performed within a Voice Data Keyset 46 with respect to the Digital Subscriber Interface 106 is the setting of the appropriate bit in the appropriate control register 210 to place the digital subscriber interface microprocessor 212 in the master mode.

Connected to the digital subscriber interface microprocessor interface 212 are two internal first-in-first-out (FIFO) 16 byte registers 214 and 216. The first of these is the readable first-in-first-out register (RFIFO) 214 which provides a means by which data can come from either of the two data channels (B1 or B2) or the control channel (D) connected to microprocessor port of the digital subscriber interface. A writable first-in-first-out register (XFIFO) 216 is likewise provided in the digital subscriber interface, allowing the writing of information from the microprocessor port) to either of the two communication channels (B1 or B2) or to the control channel (D), as discussed above. The operation of both first-in-first-out registers 214 and 216 are controlled by special control bits which are contained in one of the control registers 210 and a special first in first out control circuit 218.

The readable and writable first-in-first-out registers are connected to a multiplexer/demultiplexer circuit 226 which provides a combination and decombination point (depending on direction of data flow) between these registers to a bi-directional synchronous port 222 (B1 channel), a serial synchronous port 224 (B2 channel), and the D channel information being sent or received by the two FIFO registers 214 and 216. The bi-directional synchronous port 222 provides a 512 kbps serial bi-directional synchronous port for B1 channel communication to other portions of the system (such as the Intel 29C51 CODEC), with the serial interface port 224 providing the B2 channel information. The data rate of the serial synchronous port 224, when the digital subscriber interface 106 is in the master mode, is 64 kbps. In the slave mode this port is not used.

Before information is sent out to the transmission line via the transceiver/receiver hybrid, the necessary framing information is added by way of the preamble generator circuit 228. This circuit generates the preamble shown in FIG. 10 for each transmission frame. The preamble consists of a seven bit frame start pattern which is inverted in each successive frame with a logic "1" being used as the eighth bit. This scheme is based on a conventional "Willard code" to provide minimum correlation with random data streams and to provide the minimum erroneous locking probability upon transmission of constant data.

Each frame of information on the transmission line contains 24 information bits with the 8 additional framing bits used as the preamble. The framing consists of a 7-bit predefined frame start pattern, which is used to identify the frame boundaries with an additional logic "1" bit used as the eighth bit. The 7-bit pattern is inverted for each successive frame. It is therefore clear that each complete frame consists of a 32-bit data stream. The output of the preamble generator circuit 228 is ORed with the data contained in the multiplex/demultiplex circuit 226. This assumes a logic "zero" output from this circuit upon no data being present in the multiplex/demultiplex circuit 226.

When the digital subscriber interface is receiving data which enters via the Transceiver Interface circuit, the frame detector circuit 230 monitors the received data, detects any frame sync patterns (preambles) within the received data and generates a received frame sync signal. This signal is fed to the multiplex/demultiplex circuit 226 to indicate that a proper frame of data has been received and that separation of the B1, B2 and D channels can occur. The frame detector contains a correlator functioning as a pattern detector. It will signal a match between the received data and a relevant pattern, such as the indication of a new frame being received, and will act as a state machine that will keep track of the status of the frame detector circuit. Upon initial power-up or software reset, this frame detector circuit 230 is in an unlocked state. Upon receipt of the pattern 11101001, the frame detector circuit shifts to a hunt state, and starts a 125 microsecond timer. Upon receipt of a 00010111 pattern, which is the inverse of the pattern mentioned above and the eight "1" bit, the circuit shifts to a lock state after 125 microseconds. If the correct pattern has not been received when the frame detector is in the hunt state, the frame detector circuit reverts to the unlock state as mentioned above. In the locked state, the circuit monitors arrival of the correct framing pattern with each frame. If an expected pattern does not appear, the circuit shifts to an additional state known as the missed state. In this state, the frame timer is set and upon receipt of the next frame, the correct pattern is sought. If this correct pattern is detected, the state of the frame detector circuit is again shifted to a locked state and if not received the state of the frame detector is shifted to the unlocked state.

In the locked and missed states, a timer within the frame detector is used to generate a signal which indicates the beginning of a frame sync pattern which would occur 32.5 microseconds (one fourth frame) prior to each matching signal. This signal is not generated in the unlocked or hunt states. If the digital subscriber interface 26 is in the master mode, the digital subscriber interface transmits a logic 1 to the line in the unlocked and hunt states of the frame detector. If the digital subscriber interface is in the slave mode, valid frames are transmitted irrespective of the state of the frame detector since the timing is externally controlled by way of the peripheral bus controller (see FIG. 4). An interrupt signal is provided by the digital subscriber interface to the microprocessor port if the frame detector detects a loss of frame locking.

The idle detect mechanism 225, is a passthrough mechanism continuously monitors the bit stream coming from the serial synchronous port 224 (SIO) (B2 channel) and detects the presence or absence of activity on the Shared Timeslot Channel when the Digital Subscriber Interface is in the master mode. This idle detect mechanism starts an internal timer which is activated upon the occurrence of a zero bit being received on the B2 channel. As all endpoints are transmitting FFH (all 1 bits) when idle, this timer will detect the presence of activity by detecting a zero being transmitted on the B2 channel of the Shared Timeslot Channel. This timer is reset each time a zero occurs in the bit stream. By use of the conventional zero/insert and delete coding in the multiprotocol serial controller circuit 102 shown in FIG. 4 or 162 shown in FIGS. 6-8, a zero will be inserted in any continuous bit stream of ones indicating real activity, rather than a stream of ones indicating inactivity. This automatically resets the timer during activity on the bus. As long as the timer has not expired, an indication is provided that the channel is active by this idle detect mechanism. This information is used by the Shared Channel Access Protocol described below. The timer's interval is set to that of the bridging period. This methodology is used in all endpoints that have a Shared Channel Access Protocol. In a Network Terminator endpoint such as is shown in FIGS. 6, 7 and 8, similar mechanisms are employed for each of the shared timeslot channels involved.

Figure 11:
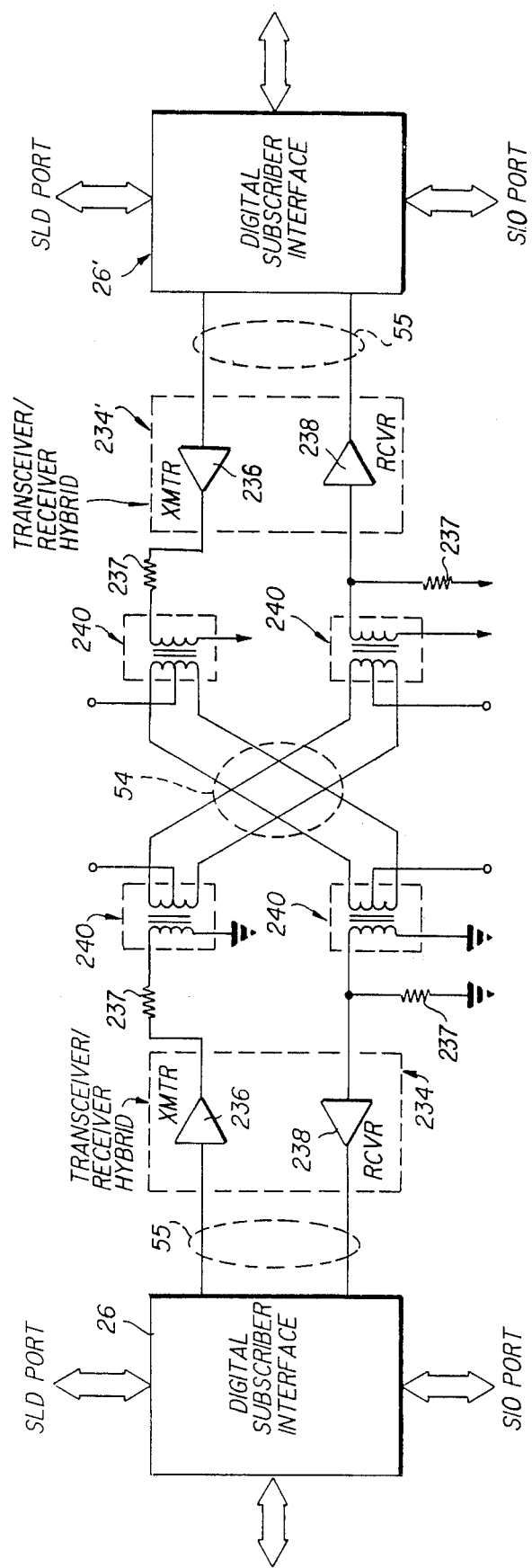
FIG. 11 is a block diagram of a Transceiver/Receiver Hybrid circuit of the Digital Subscriber Interface.

The transceiver receiver hybrid circuit 234 can be seen more clearly in FIG. 11, which shows the digital subscriber interface 26 interconnection scheme. The Transceiver/Receiver hybrid provides for a conversion from NRZI coding used by the internal logic of the Digital subscriber Interface to a conventional AMI 50% cosine bipolar pulse signal for longer communication lengths.

Referring now to FIG. 11, the transceiver hybrid circuit 234 is connected to digital subscriber interface 26 on both ends of the dual twisted pair connections. A digital subscriber interface 26 is connected to a transceiver hybrid circuit 234 which provides necessary communication with the transceiver hybrid cricuit 234', connected to the digital subscriber interface 26'. The digital logic subscriber interface 26 is operating in the master mode in the Voice Data Keyset 46 with the digital subscriber interface circuit 26' located within a Digital Station interface 22 operating in the slave mode. It should be noted that the transmitter output side of the transceiver hybrid circuit 234 is connected to the receiver side of the transceiver hybrid circuit 234', and vice versa, allowing full duplex communication between these two circuits.

The hybrid transceiver circuit consists of two major components. A pulse transmitter 236 provides the circuitry necessary to receive the input signal from the digital subscriber interface circuitry, and generates the necessary bipolar pulses (AMI 50% raised cosine) into a line transformer 240 for transmission over the twisted pair connection. A pulse receiver 238 provides the circuitry necessary to receive the incoming bipolar pulses from the twisted pair line which conform to a conventional AMI 50% raised cosine scheme (through a line transformer 240) and generates a unipolar bit stream (i.e. a logic "1" being a pulse with a logic "0" being no pulse). Also included within this pulse receiver circuit are conventional adaptive equalizer and threshold detector circuits.

The pulse transmitter 236 and receiver 238 are connected to the line pairs by a pulse transformer and termination resistors. These transformers 240 have a two-to-one winding ratio to accommodate the necessary impedance matching to the line. Termination resistors 237, as shown in FIG. 11 are 510 ohm resistors which are externally connected to the hybrid transceiver for providing the necessary termination function. The secondary transformer windings are also used to provide power through the lines using a conventional phantom connection scheme.

The Internal Link Access Protocol or (ILAP)

The Internal Link Access Protocol or (ILAP) provides the control of the data interchange between two endpoints. The continuous exchange of information is referred to as a session. The Internal Link Access Protocol controls packet flow between endpoints. The frames or packets of information are coded with frame numbers that are appended to each frame. The receiving endpoint acknowledges the receipt of each frame by echoing back the frame number. Various timers as will be discussed below provide watchdog functions over the data flow.

The procedures and principles of Internal Link Access Protocol utilize the terminology of a conventional X.25 Link-layer Protocol. It should be noted that while the terminology is X.25 standard, implementation of the protocol in this invention is not standard. Internal Link Access Protocol is a balanced protocol and therefore there exists no primary/secondary relationship between the endpoints. The transmission facility used, is logically a half duplex use of a timeslot channel on the Peripheral bus 16 PCM highway and is controlled by the Shared Channel Access Protocol discussed below. Based on the conventional software programming technique of information hiding, each Internal Link Access Protocol procedure may be modeled as being directly connected to its counterpoint receiver, even though an additional software layer (the Shared Channel Access Protocol procedure, disussed below) intervenes to arbitrate and handle traffic flow on each of the Shared Timeslot channels.

The previously described software data link layer in combination with the Shared Channel Access Protocol allows multiplexing of logical active sessions on the same physical timeslot channel. The technique used is a Carrier Sense Multiple Access with Collision Detect (CSMA/CD) technique. When an endpoint begins to transmit in the absence of traffic on the channel, the physical layers of all other stations on that channel will alert their respective Data Link layers to avoid conflicts in an attempts to transmit. At this time all other stations will become receivers on channel. Each packet of transmitted information is in the conventional HDLC frame format and starts and ends with a Flag (7EH). After the detection of a flag at an endpoint, the packeted data is passed on to the data link layer. The Data Link link layer will then check the address field of the received packet on the fly to determine if the packet was intended for that endpoint. If the packet is intended for the endpoint it will be processed, if not it will simply be discarded. It is noted that the Internal Link Access Protocol is a bit oriented protocol, but the information within the packets is organized in bytes.

Figures 10, 12:
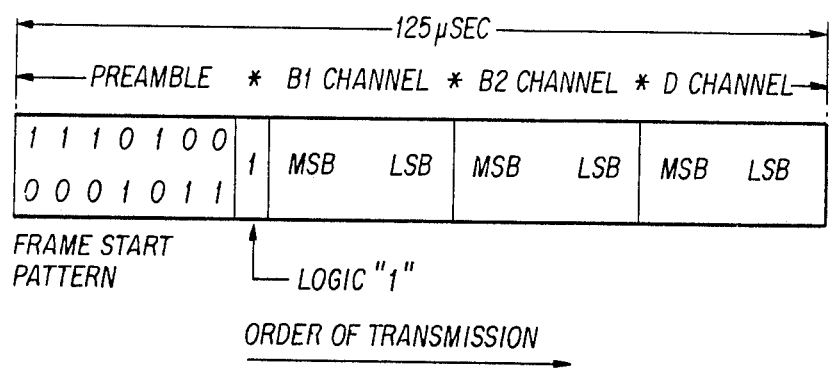
FIG. 10 is a timing diagram illustrating a Data Frame structure.
FIG. 12 is an illustration of an Internal Link Access Protocol/Information frame.

Referring to FIG. 12, a logical one byte identification address is shown that is assigned to each endpoint by the Master Command processor 10 upon start up of each data communication session under the provisions of the Internal Link Access Protocol. The address is unique to that endpoint and that session.

Every endpoint maintains various logical states that are used to control the transfer of data. These logical states are entered and terminated by recognizing a unique condition and serve to govern information flow and control over the transfer data. Every endpoint maintains the following logical states:
Idle State (IS);
Data Link Establishment State (DLES);
Information Tansfer State (ITS); and
Logical Disconnect State (LDS).
Software procedures are maintained and described below with respect to each of these states.

Figure 13:
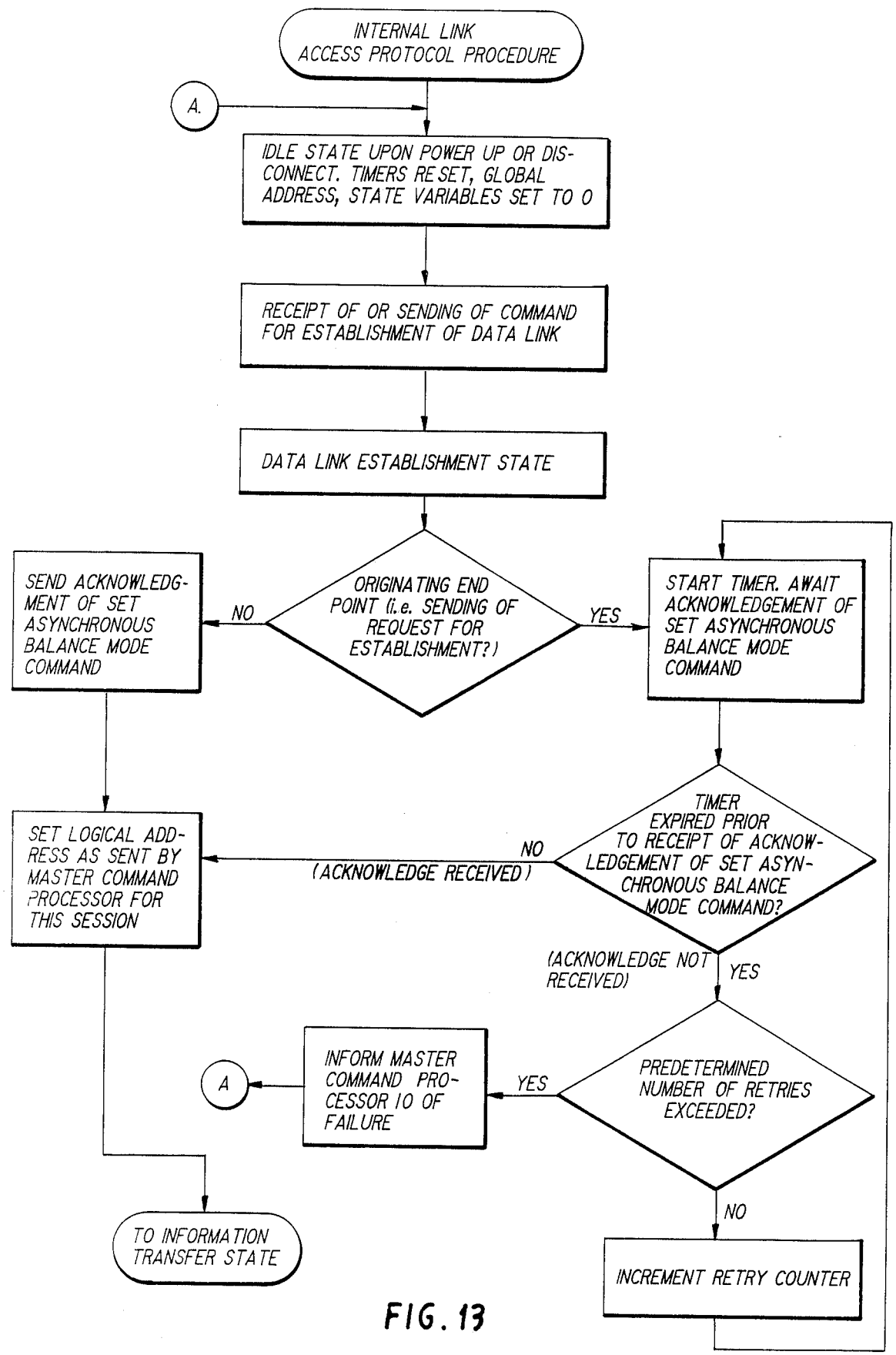
FIG. 13 is a logic flow chart illustrating operation of the Internal Link Access Protocol.

As shown in the flow chart of FIG. 13, the Idle State is entered by an endpoint upon the occurrence of either of the following conditions: (1) power-up or (2) after completing the session (i.e. data link session or any other session on that timeslot channel. For example, after completing the disconnect procedure of the Logical Disconnect state.)

In the Idle State mode the endpoint is only capable of transmitting and receiving command data. The Idle State is terminated by receiving a session establishment command from the Master Command Processor 10. After receipt of a command to establish a data link session command from the Master Command Processor 10, the endpoint will enter a state referred to as the Data Link Establishment State.

The Data Link Establishment State (DLES), as shown in FIG. 13, is entered from the Idle State upon the Idle States receipt of the command from the Master Command Processor 10 to establish a session. This is a transient state. Normally the Data Link Establishment State is terminated by a station upon one of the following occurrences:

(a) the transmitting of an Asynchronous Balance Mode command and receiving a signal that the endpoint has received a Set Acknowledgement Command ty the partner or receiving endpoint; or (b) the receiving of a set Asynchronus Balance Mode Command and the sending of an appropriate Set Acknowledgment response to the sending endpoint.

The terms sending and receiving are artitrarily assigned to the two endpoints involved in the data transfer as the transfer is a bi-directional flow including requests and acknowledgments. A normal exit from the Data Link establishment state is tc the Information Transfer State.

If either conditions (a) or (b) fails to occur within a predetermined interval established by system parameter timer T, then the endpoint will terminate the Data Link Establishment State and enter the Logical Disconnect State. This occurs if an erroneous establishment command is sent or received or the other endpoint involved does not respond with an indication that a session can begin.

Upon generation by the Master Command Processor 10 of the command to establish a session, the Master Command Processor will assign a logical address and notify the sending and receiving endpoints about the data link session set-up.

The originating endpoint that wishes to establish a session sends a set asynchronous balance mode command and starts a timer T1. Upon receipt of an acknowledgement response from the receiving endpoint of this command, the originating endpoint will reset both send and receive state variables that are maintained by each Internal Link Access Protocol Procedure to zero, thereby stopping the timer T1. The receiving endpoint will also reset its state variables when the acknowledgement command is sent.

Should timer T1 expire before reception of the acknowledgement endpoint response from the receiving endpoint, the sending endpoint will retransmit the Set Asynchronous Balance Mode command and restart the timer T1. After transmission of this command a predetermined number of times (N2) by the originating endpoint, the originating endpoint will notify the Master Command Processor 10 of the failure to establish a session and the Master Command Processor will take the appropriate action to release the endpoint and start diagnostic procedures.

After having received the acknowledgement response to a transmitted Set Asynchronous Balance Mode command or having transmitted the acknowledgement response to a Set Asynchronous Balance Mode command, the station will accept and transmit information frames according to the procedures described below with respect to the Information Transfer State.

If an endpoint receives a Set Asynchronous Balance Mode command while in the Information Transfer State, the endpoint will reset its state variables (described below with respect to the Information Transfer State) and remain in the Information Transfer State.

When an endpoint wishes to terminate the data link session, it will send a disconnect command and start the timer T1. Upon receipt of the acknowledgement of a disconnect response from the partner endpoint, it will stop its timer T1, and conclude the completion of disconnect, with success.

Should timer T1 expire prior to receiption of the acknowledgement of disconnect from the receiving endpoint, the originating endpoint would conclude the completion of disconnect with notification cf this condition to the Master Command Processor 10.

If a station receives the disconnect ccmmand, it will return an acknowledgement of disconnect and conclude the completion of disconnect with notification of this occurrence to the Master Command Processor 10.

At the conclusion of completing disconnect, the station will notify a higher layer that the disconnect has been completed with appropriate reason for the disconnection and change its logical address to that of a global address, so that frames may reach it without being discarded. The procedure will then pass control to the Idle State processor.

Information Transfer State

The Information Transfer State or (ITS) is an operational state. In the Information Transfer State either endpoint can transmit or receive information frames.

Figure 14:
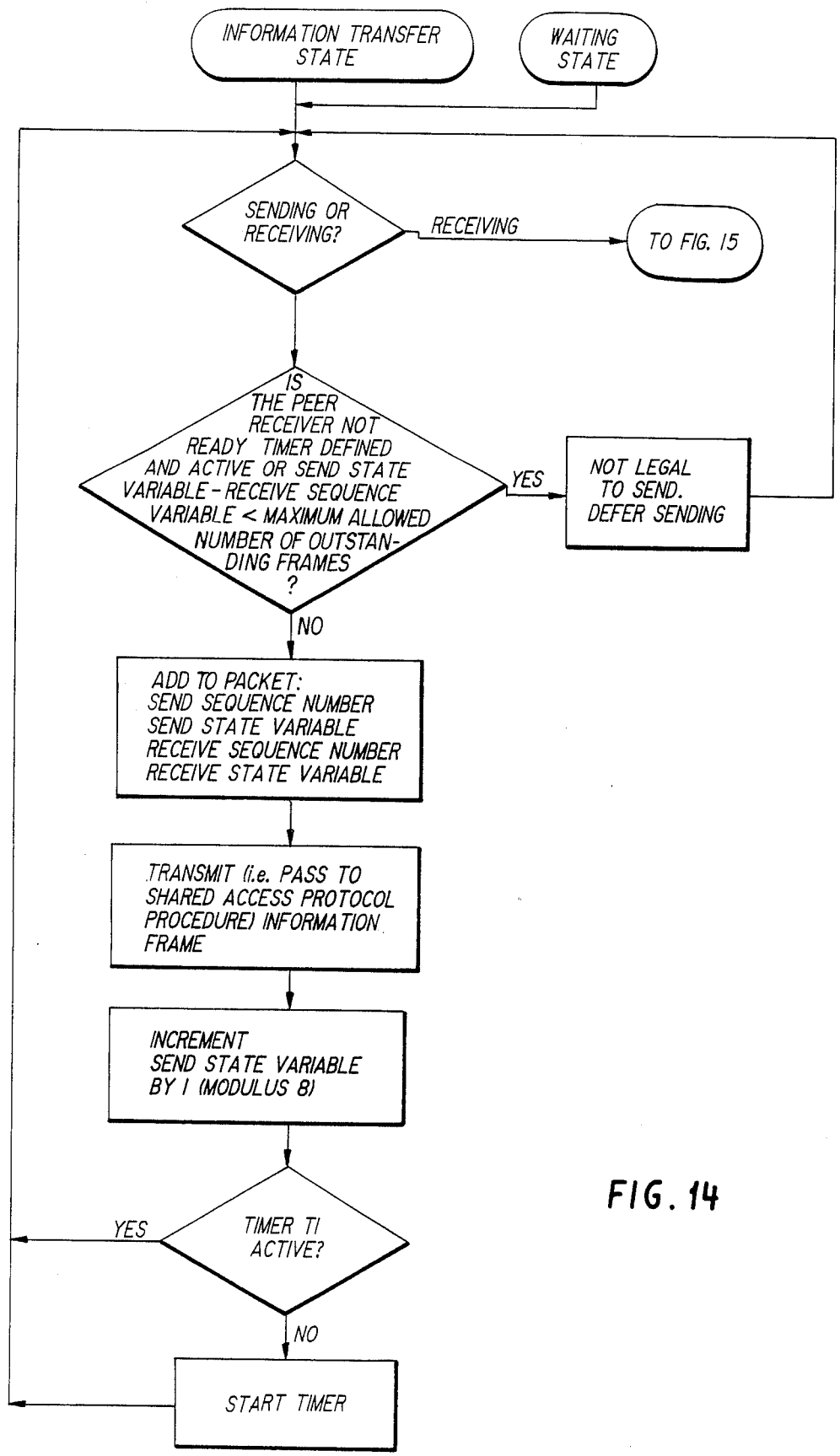
FIG. 14 is a further logic flow chart of the Internal Link access Protocol.
Figure 15:
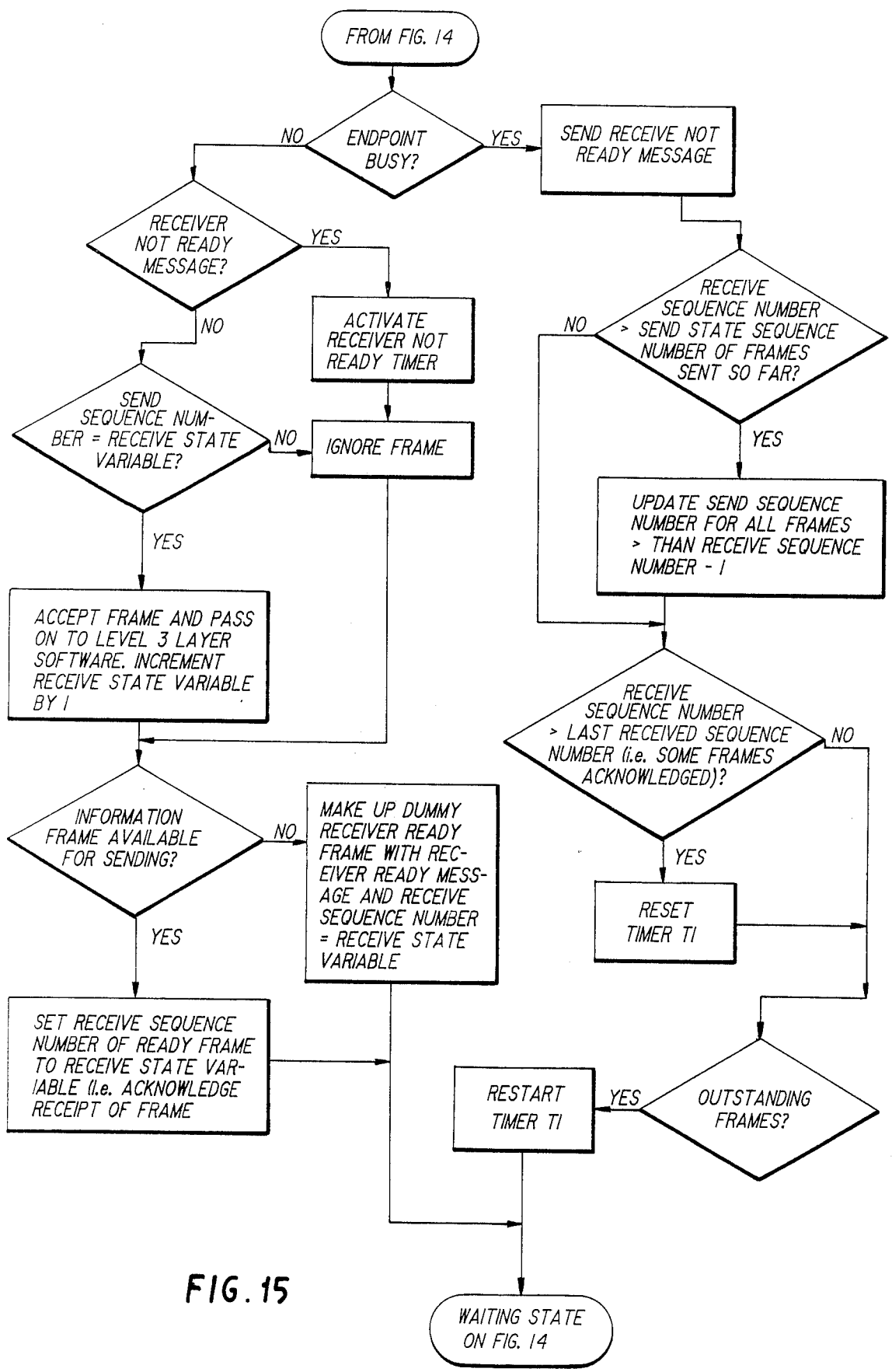
FIG. 15 is a further logic flow chart of the Internal Link access Protocol.

The information exchange is controlled by way of the procedures now to be described. It is first noted that this section, together with FIGS. 14 and 15, describes the procedures which apply to the transmission of frames of information (Iframe) in each direction during the information transfer phase.

When an endpoint has a frame of information to transmit, it will check for the legality of sending. It is legal to send, if a send state variable V(S) is equal to the last value of a receive sequence number variable N(R). These variables are maintained by each of the information transfer states software contained in the endpoint's Internal Link Access Protocol processor. The send state variable or V(S) is a variable that denotes the sequence number of the next Information frame in sequence to be transmitted. This variable is incremented from 0 to 7 (modulo 8) upon the sending of each Information frame with overflows being ignored. The receive sequence number N(R) is a variable maintained by the information transfer software that contains the next expected iniormation frame sequence number. This variable, like the send state variable, is incremented upon correct receipt of an information frame bearing this frame number. If it is proper to transmit then the station will perform the following tasks:

(a) set a send sequence number variable to the current send state variable;

(b) set the receive sequence number variable to the current receive state variable;

(c) concatenating to the packet to be sent the sequence number variables;

(d) transmit an Information frame; and (e) increment the send state variable V(S) by one (modulo 8).

When an endpoint is not in a busy condition and receives an Information frame with correct addressing for this endpoint, it will operate as follows:

If the send sequence number variable of the frame is equal to the receiving endpoint's receive state variable V(R), the receiving end will accept the information field of the frame and increment its receive state variable by one. If the send sequence number of the frame is not equal to the receiving endpoint's receive state variable, it will discard the information field of the frame.

If an information frame is available for transmission by the receiving endpoint, then it will set the receive sequence variable field of the ready information frame equal to the value of the receiving endpoint's receive state variable. If no information frame is available for transmission by the receiving endpoint, the receiving endpoint will transmit a special receive ready frame with the receive ready variable being set equal to the value of receiving stations receive state variable. When a receiving station is in a busy condition, it will ignore the information contained in any received information frame.

Any frame received with an address not equal to that endpoint's logical address assigned at the beginning of a session will be discarded, and no action is taken as the result of that frame. When correctly receiving an information frame, even if the endpoint is in the busy or frame rejection condition, the receiving endpoint will consider the received sequence number N(R) contained in the received frame as an acknowledgment for all the information frames it has transmitted with a send sequence number up to and including the receive sequence number minus one.

Upon receiving a reject signal, the receiving endpoint will set its send state variable V(S) to the Receive sequence number N(R) received in the reject portion of the control field of the Information frame. It will retransmit the corresponding Information frames that were rejected. If other unacknowledged information frames had already been transmitted following the one indicated by the rejected frame, then those frames will be transmitted in order by the initiator following the retransmission of the requested Information frames. Each endpoint maintains an internal retransmission count variable which is set to zero initially.

If an endpoint, due to a transmission error, does not receive (or receives and discards) a single Information frame, or the last information frame in a sequence of Information frames, it will not detect an out-of-sequence exception condition and therefore will not transmit the rejection signal. The sending endpoint which transmitted the unacknowledged information frames will, following the completion of a time-out period started at the transmission of eaah frame (T1), resolve the problem by transmitting to the receiving endpoint a receive number inquiry command along with a restart of the Timer T1.

If this T1 times out again, the information transfer procedure adds one to its retransmission count variable, restarts timer T1 and re-issues the restart command. This command includes an inquiry as to the next frame expected by the receiving endpoint. The receiving station will then respond with a receive number answer response. On receipt of the response, the timed out endpoint will process the received frame's receive sequence variable N(R), requeue for retransmission all unacknowledged Information frames, release timer T1 and clear the retransmission count variable.

If the receiving endpoint fails to respond to the sending endpoint's timed-out station's receive number inquiry for the receive number, the sending station will time out again. On timing out due to no response, the endpoint will restart its Timer T1, increment its retransmission count variable and reissue the request for the correct frame.

If the station times out, waiting for a response in excess of a maximum number of times (N2) (preset for each endpoint), the timed-out endpoint will enter the Logical Disconnect state and initiate the disconnection procedures, ending the session.

The logical disconnect state (not shown in the figures for clarity), like the Data Link Establishment State, is a transient state. The procedures involved in this state occurs upon a session disconnect request that occurs naturally during the information transfer state (i.e. the session has ended normally) or during the Data Link Establishment state's failure to receive an acknowledgment of successful establishment of a session. This procedure sends a Disconnect signal to its partner and upon receipt of the acknowledgment, logical disconnect occurs. Upon receipt of a disconnect command the receiving endpoint sends an acknowledgment of the command and completes the disconnect. Upon sending the disconnect command, the sending endpoint will start a timer. If the acknowledgment is not received prior to the expiration of this timer, the endpoint will complete the disconnect without acknowledgment. The exit from this procedure is back to the Idle State described above.

Shared Channel Access Protocol or SCAP

This section describes the method and procedures used according to the invention for accessing a shared timeslot on the PCM bus. These procedures interface with the Internal Link Access Protocol layer and the data transmission medium (PCM shared timeslot channels).

The Shared Channel method of communication is used to enhance bandwidth utilization of each of the 64 Kbps PCM timeslot channels as will be apparent to those skilled in the art. In the system of the invention, more than one such channel can be assigned to carry user data. The procedures to be described now are invoked on each of these channels separately. In a shared channel setup, two or more pairs of data endpoints are always involved. Each pair is virtually connected through the channel, using the Internal Link Access protocol packet exchange procedures set forth above. Each endpoint has a separate transmit and receive mechanism, and this separation is maintained in all layers, including the physical level.

In a shared channel setup, all endpoints transmit and receive on the same shared channel, making the channel a half duplex medium. Because of this principle, each endpoint receives the transmissions of all endpoints, including its own. Thus, the channel can be logically thought of as a single wire, and all endpoint transmitters and receivers are connected to it.

Propagation Delay is an inherent property in the Switching system. This delay is caused by the transmission and switching circuitry itself at the physical level, and introduced due to the timeslotted architecture of the transmission medium. All transmission and switching functions are confined to 125 microsecond transmission frames. This is mandatory because both transmission and switching involve multiplexing of the PCM highway. Therefore each multiplex/demultiplie or format change introduces approximately one transmission frame of delay.

Each endpoint has a channel monitoring circuitry, i.e. the Idle Detect mechanism 225 discussed above in relation to the Digital Subscriber Interface of FIG. 9. This circuitry is based on the use of FFH (Hexadecimal FF, or eight '1's as the idle character sent by the Internal Link Access Protocol procedure. This Idle Detect mechanism is used to monitor the channel by all endpoints. The Idledetect mechanism generates a signal that is logically true only if the last N received bytes (transmission frames) where all idle characters. N is programmable and can be any even number from 2 to 16. The history reflected by an Idle Detect signal is a time interval known as the Bridging Period (BP). This Bridging Period is set to be greater than the propagation delay in the system. The propagation delay is either uniform or set so as to be uniform throughout the system and all Idle detectors at all endpoints connected to a shared time slot channel will have the same output signal at all times.

For purposes of illustration one may assume that each timeslot channel has the following parameters:
Bare channel thruput—64 Kbps;
Transmission rate—8 bits/frame;
Character—8 bits;
Shared Access Transmission frame—125 microseconds;
Propagation delay (PD)—6 frames (average);
Bridging Period (BP)—8 frames; and Channel capacity (C)—8,000 char/sec.

Note that the term "Transmission Frame" is not to be confused with the Information Frames in the Internal Link Accesss Protocol. Information frames consist of many transmission frames, whereas each Shared Access Protocol transmission frame carries one byte of information.

Figure 16:
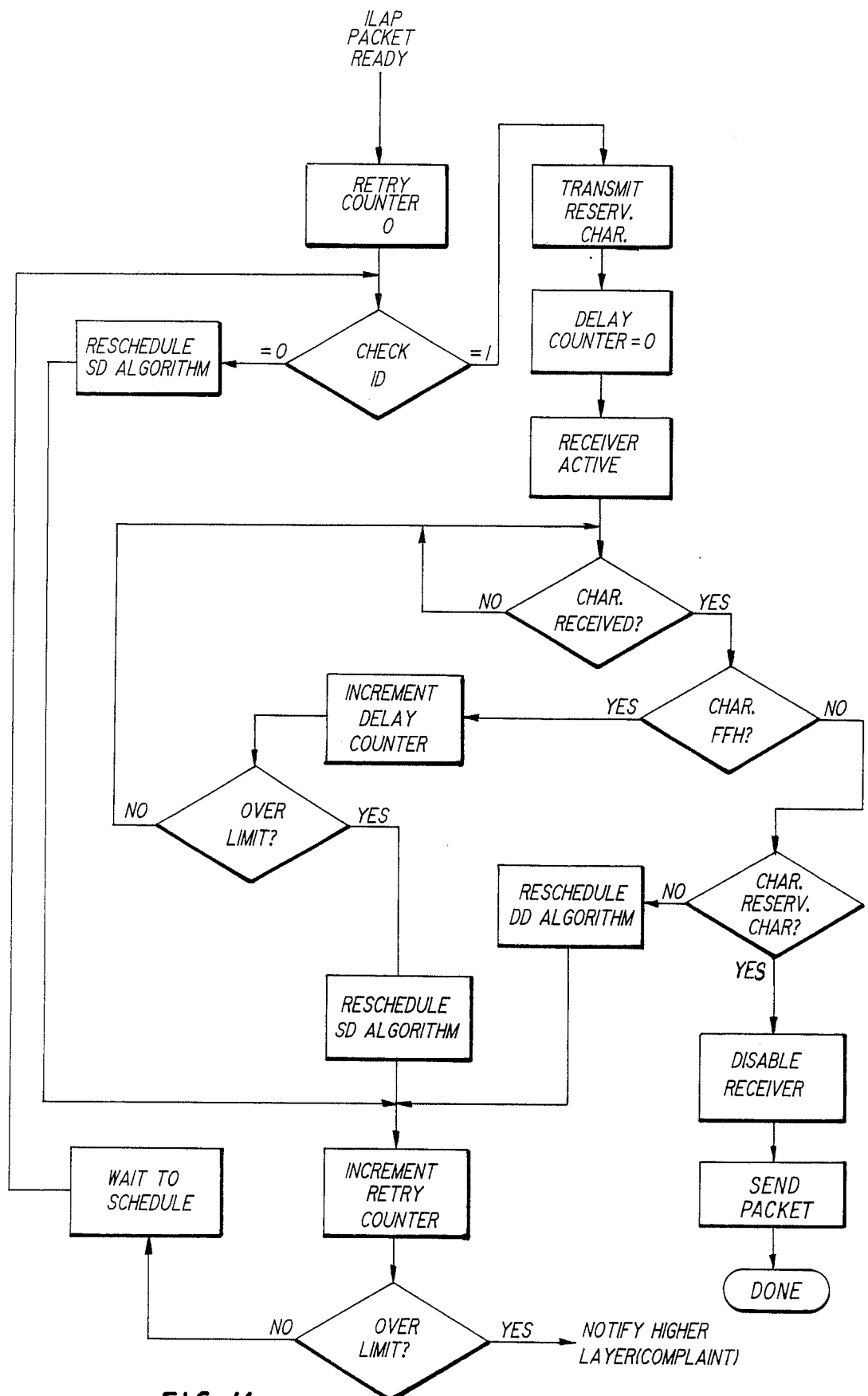
FIG. 16 is a logic flow chart of the Shared Channel Access Protocol Contention Resolution method of the invention.

The contention resolution method shown in FIG. 16 used in the Shared Access Protocol procedure employs the Idle Detect mechanism of the timeslot channel in the same way a carrier detector is used in a conventional CSMA/CD system. Thus, when SCAP gets a packet ready signal from the Internal Link access Protocol procedures, the Idle Detect mechanism is first checked. If the Idle detect signal produced by the idle detect mechanism is false (i.e. the channel is busy), the transmission of the packet is rescheduled. This rescheduling is called Simple Deferance. The rescheduling is performed according to the Simple Defferance Algorithm set forth below.

If the Idle Detect check shows that the timeslot channel is free, a reservation method is used to eliminate undetectable collisions due to the propagation delay inherent in the system. Ihe reservation method uses a transmission of a special Reservation Character (RC), which is unique for each transmitter as mentioned previously.

Figure 17:
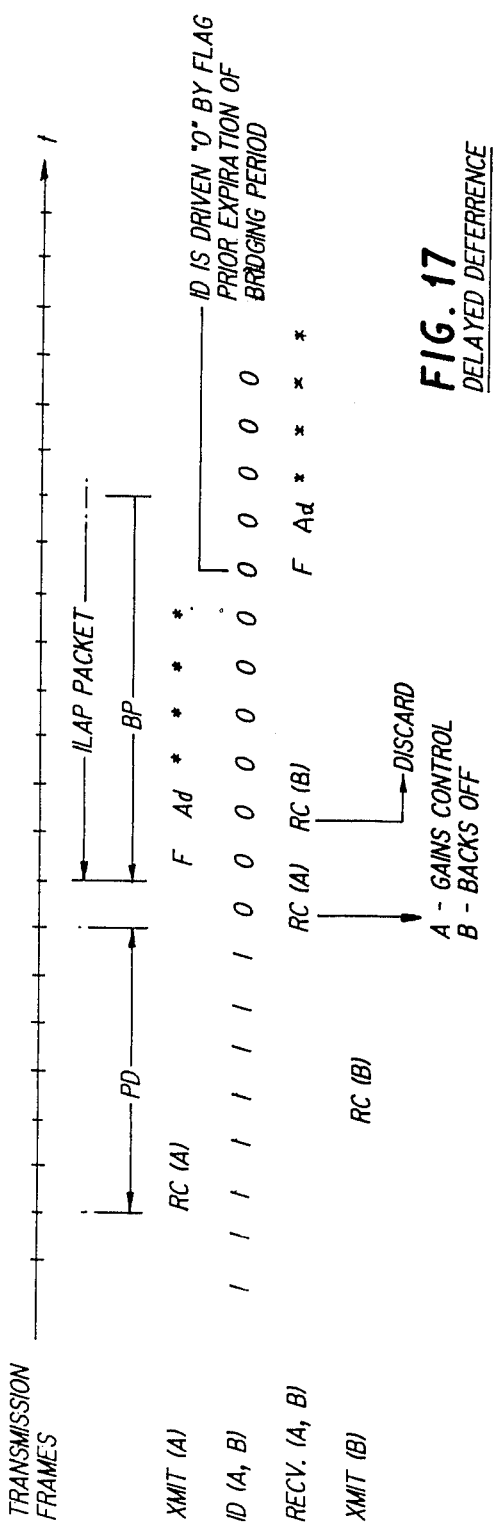
FIG. 17 is a timing diagram showing a Delayed Defferrance in the Shared Channel Access Protocol; and, FIG. 18 is a timing diagram illustrating the Collision Detection technique in the Shared Channel Access Protocol.
Figure 18:
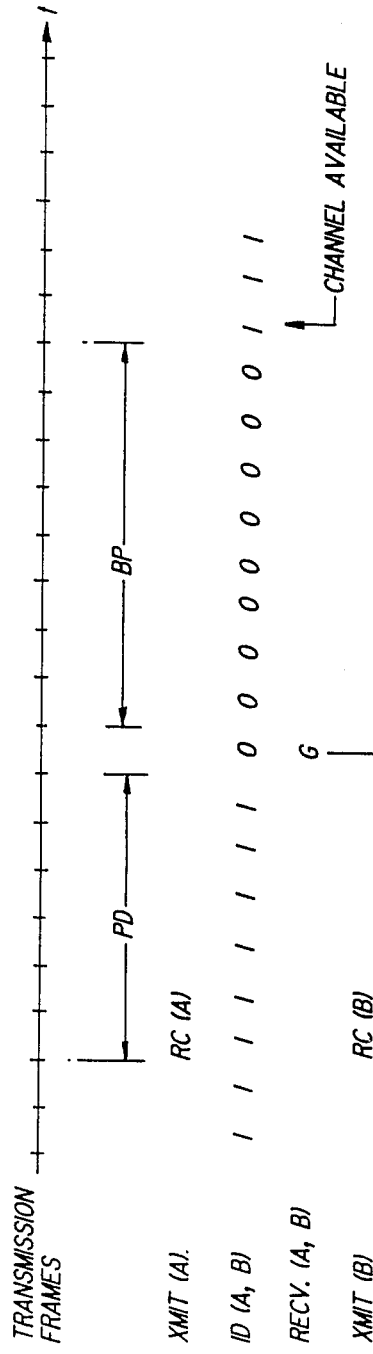

If the channel was reserved by selected endpoint A for example, then after the Propagation Delay (PD) all Idle Detect signals at all endpoints sharing the channel will become false. That is they will detect activity on the timeslot channel, and any transmitter attempting to access the channel will face a simple deferrance (SD). Since an Idle detect is driven to false only for a time interval equal to the bridging period, it is required that the bridging period be set as greater than the propagation delay. If however, another endpoint B, for example, tries to reserve the channel during the propagation of the Reservation character from endpoint A, a Delayed Deferrance occurs. This conflict will be resolved by the fact that the reservation character of A will arrive first at all receivers, including receiver B. Endpoint B then will then withdraw, since it received a character not matching its own Reservation character. It's transmission is rescheduled using the Delayed Defferrance algorithm set forth below. FIG. 17 shows the timing in case of a Delayed Deferrance.

If the two endpoints, A and B send RC's (Reservation Characters) on the same transmission frame, collision occurs. In this case, two possibilities exist:

(a) Neither A nor B receives a correct RC (the two RC's garble each other).

(b) Only one of them receives a correct RC. This latter situation is called One-Sided Collision.

In situation (a), both A and B will withdraw. However, the endpoint cannot resolve whether this was a Delayed Deferance or a collision. Therefore, rescheduling will be according to the Delayed Deferrance Algorithm set forth below. Again, FIG. 17 shows the timing for this type of collision.

A one-sided collision may occur, due to the nature of the shared timeslot channel transmission system. Different endpoints can use the same timeslot channel due to the fact that an inactive transmitter transmits FFH characters all the time. The transmission system ANDs all transmitter outputs, thus FFH is a transparent character.

This implies, that in some combination of the two different Reservation Characters, their AND can yield one of them. For example: 10110111 and 11110111=10110111. In randomly chosen byte wide RC's, this can happen with a probability of approximately 10%. In the case of a one-sided Collision, only one transmitter will withdraw, according to the Delayed Deferrance algorithm and the other gains control of the channel.

If, for any reason, the reserving endpoint does not receive any character, other than an idle character within a predetermined time from its reservation, a Delay Counter, which is started at the time the reservation character is sent, will exceed its maximum permitted value, and a timeout or Watchdog Deferrance occurs. This kind of deferrance is not normally anticipated in the system. The Delay Counter is a diagnostic device, to ensure that a reserving endpoint is released from waiting if for any reason the Reservation Character is not propagated properly. In this case, rescheduling will be based on the Delayed Deferrance algorithm discussed below.

A conventional exponential backoff principle that is used in most conventional CSMA/CD access methods is employed in the Shared Channel Access Protocol. According to this principle, a transmission is rescheduled by a random delay, which is computed as follows:

If X is a uniformly distributed random integer in the range $1 \leq X \leq R*(2**N)$ where R is an initial range, and N is the number of the current retry attempt or a maximum limit, with N=0 before the first attempt. The delay is then X times a basic delay increment Ti. This means that if the first attempt to access the line is unsuccessful, then the delay is set to be between Ti and R*Ti. The mean value of the delay time being set equal $0.5*(R+1)*Ti$. In successive attempts, the range R increases exponentially, with N being updated after a failed attempt to transmit. This provides a gradual increase in waiting times, according to the traffic volume on the channel.

For processor load considerations, the Shared Channel Access Protocol of this invention uses a nonpersistent approach wherein all cases of defference and collisions cause some finite-probability of delay. Therefore, the simple Deferrance algorithm of this invention uses an exponential backoff with Rs=2 and Ti=1 milliseconds (or 8 frames) where N is a retry number up to a limit of 6 which is set as a system parameter. Therefore, the range of X is limted to limited to $1 < X < 128$ and the maximum waiting time is 128 milliseconds. The maximum number of retry attempts is a system parameter set at 16. The Delayed Deferrance algorithm uses an exponential backoff with Rd=2. All other parameters within the Delayed Defference Algorithm are the same as for the simple deferrance algorithm above.

Random numbers used for the backoff algorithm are generated by a pseudorandom algorithm, with a repetition cycle of at least 65535. This conventional algorithm generates uniformly distributed 8 bit numbers, representing integers 1 ... 256. For N=0 the least significant bit of the random number generator is used as X. (If the bit is '0', X assumes the value 2). For N=1 ... 6 the appropriate number of low order bits of the random number are used as X.

A software mechanism called watchdogging is used to detect the case of timeslot channel blocking, that is when a faulty endpoint fails to release the channel and therefore blocks it. Each connected endpoint keeps a watchdog timer on the signal generated by the endpoints Idle Detect mechanism. This is performed by repetitive polling of the Idle Detect signal, as a background task on each endpoint's microprocessor. The timer is set so that in all operating conditions (normal or extreme) it will not time-out. However, it can sense a blocked channel situation. Polling is performed evey 50 ms. In case of 128 consecutive false Idle detect conditions (channel unavailable) the Master Command processor is notified—thus in case of channel blocking, the Master Command Processor will receive multiple warnings—concluding a blocking.

Additional modifications of this system may be provided by adding various types of network interfaces to support various new protocols as they are established, thereby preventing the obsolescence of this system. By providing the Shared Channel Access Protocol and the Internal Link Access Protocol at each endpoint or in the case of network termination endpoints multiple copies of these procedures, multiple communication sessions may occur at logically the same time in this system. By providing these multiple communication paths within the system high speed data communication is possible between multiple terminals and multiple hosts in an inexpensive and efficient manner. Maximum utilization of the data paths within the system is provided by the methodology set forth above.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A system for transmitting and receiving data comprising:
   a peripheral PCM bus;
   multiplexing means coupled to said bus for logically establishing a plurality of timeslot channels on said bus;
   a plurality of endpoints coupled to said bus;
   assignment means contained within each endpoint for assigning each endpoint to a timeslot channel;
   idle detect means contained in each endpoint for detecting activity and inactivity on said timeslot channel assigned to said endpoint;
   reservation transmit means contained in each endpoint for transmitting a reservation character unique to each said endpoint in response to said idle detect means detecting inactivity;
   reservation detect means contained within each endpoint for receiving said reservation characters transmitted by said reservation transmit means and for determining whether a particular reservation character has been received and whether it is in an uncorrupted state;
   packet transmission means coupled to said reservation detect means for transmitting a packet of data on said selected timeslot channel in response to reception of a said particular reservation character in an uncorrupted state.

2. A system as in claim 1, further comprising:
   first retransmitting means coupled to said reservation detect means for retransmitting said particular reservation character in response to reception of said particular reservation character in a corrupted state.

3. A system as in claim 2, further comprising:
   second retransmitting means coupled to said reservation detect means for retransmitting said particular reservation character in response to receipt of a reservation character that differs from said particular reservation character.

4. A system for transmitting and receiving data comprising:
   a peripheral PCM bus;
   multiplexing means coupled to said bus for logically establishing a plurality of timeslot channels on said bus;
   a plurality of peripheral endpoints coupled to said bus;
   at least one network termination endpoint coupled to said bus;
   peripheral assignment means contained within each peripheral endpoint to assign each of said endpoints to a given shared timeslot channel;
   network assignment means contained within each of said network terminator endpoint to logically connect each of said network terminator endpoint to a dedicated timeslot channel;
   idle detect means contained within each of said peripheral endpoints and said network termination endpoints to detect activity and inactivity on said assigned timeslot channel;
   reservation transmission means contained with each peripheral endpoint transmitting a reservation character unique to each peripheral endpoint in response to said idle detect means detecting inactivity on said assigned timeslot channel;
   reservation character storage means for storing a plurality of unique reservation characters in each of said network terminator;
   transmitting means contained within said network termination endpoint for transmitting one of said unique reservation characters in response to said idle detect means, in said network terminator, detecting inactivity on said dedicated timeslot channel;
   packet transmission means contained in said peripheral endpoints and said network teminator endpoints for transmitting a packet of data from said peripheral or said network terminator endpoint on said timeslot channel in response to reception of a said reservation character in an uncorrupted state.

5. A system as in claim 4 further comprising:
   first retransmitting means in each peripheral endpoint coupled to said reservation transmission means for retransmitting said particular reservation character in response to reception of said particular reservation character in a corrupted state.

6. A system as in claim 4 further comprising:
   second retransmitting means in each peripheral endpoint for retransmitting coupled to said transmission means said particular reservation character in response to receipt of a reservation character that differs from said particular reservation character.

7. A system as in claim 4 further comprising:
   first retransmitting means in each network endpoint coupled to said reservation transmission means for retransmitting said particular reservation character in response to reception of said particular reservation character in a corrupted state.

8. A system as in claim 4 further comprising:

second retransmitting means in each network endpoint for retransmitting coupled to said transmission means said particular reservation character in response to receipt of a reservation character that differs from said particular reservation character.

9. A system for transmitting and receiving data comprising:
   a peripheral PCM bus;
   multiplexing means coupled to said bus for logically establishing a plurality of timeslot channels on said bus;
   a plurality of peripheral endpoints coupled to said bus;
   at least one network termination endpoint coupled to said bus;
   peripheral assignment means contained within each peripheral endpoint to assign each of said endpoints to a given shared timeslot channel;
   a plurality of Network terminator endpoint receiver means contained within each of said network terminator endpoints;
   network assignment means contained within each of said network terminator endpoint to logically connect each of said network terminator endpoint receiver means to a timeslot channel;
   idle detect means contained within each of said peripheral endpoints and said network termination endpoints to detect activity and inactivity on a given timeslot channel;
   reservation transmission means contained with each peripheral endpoint transmitting a reservation character unique to each peripheral endpoint in response to said idle detect means detecting inactivity on said assigned timeslot channel;
   reservation character storage means for storing a plurality of unique reservation characters in each of said network terminator;
   first transmitting means contained within each network terminator for transmitting one of said unique reservation characters in response to said idle detect means, in said network terminator, detecting inactivity on a first timeslot channel;
   second transmitting means contained within each network terminator for transmitting one of said unique reservation characters in response to said idle detect means in said network terminator, detecting inactivity on a second timeslot channel;
   packet transmission means contained in said peripheral endpoints and said network terminator endpoints for transmitting a packet of data from said peripheral or said network terminator endpoint on a timeslot channel in response to reception of a said reservation character in an uncorrupted state.

10. A system as in claim 9 further comprising:
   first retransmitting means in each network endpoint coupled to said first reservation transmission
   second retransmitting means in each network terminator endpoint coupled to said second reservation transmission means for retransmitting said particular reservation character in response to reception of said particular reservation character in a corrupted state.

11. A system as in claim 9 further comprising:
   third retransmitting means in each network endpoint for retransmitting coupled to said transmission means said particular reservation character in response to receipt of a reservation character that differs from said particular reservation character;
   fourth retransmitting means in each network terminator coupled to said second transmission means for retransmitting said reservation character in response to the receipt of a reservation character that differs from said particular reservation character transmitted by said second retransmitting means.

12. A method of transmitting and receiving data between peripheral endpoints connected to a peripheral bus comprising the steps of:
   creating a plurality of virtual timeslot channels on said peripheral bus;
   dynamically assigning peripheral endpoints to a given timeslot channel;
   detecting by said peripheral endpoint activity on a given timeslot channel;
   transmitting from a selected peripheral endpoint a reservation character unique to that peripheral endpoint in response to the detection of a lack of activity on said timeslot channel;
   transmitting a packet of data from said selected endpoint in resonse to the receipt of said reservation character back at said endpoint in an uncorrupted state.

13. A method as in claim 12 further comprising the step of:
   repeatedly retransmitting after a period of time from said peripheral endpoint said reservation character unique to said peripheral endpoint in response to the receipt of said reservation character in a corrupted state.

14. A method as in claim 12 further comprising the step of:
   repeatedly retransmitting after a period of time from said peripheral endpoint said reservation character unique to said peripheral endpoint in response to the receipt of said reservation character other than said endpoints unique reservation character.

15. A method as in claim 12 further comprising the step of:
   dynamically assigning multiple endpoints to given timeslot channel.

16. A method as in claim 15 further comprising the additional steps of:
   concatenating to each transmitted packet of data an address associated with a receiving peripheral endpoint.

17. A method as in claim 16 further comprising the additional steps of:
   concatenating to each transmitted packet of data a packet frame number unique to that packet and further concatenating to each transmitted packet of data a packet frame number of the packet last received by said transmitting endpoint.

18. A method as in claim 17 further comprising the steps of:
   comparing at a receiving peripheral endpoint the packet frame number of a received packet against a stored packet frame number of the last received packet number;
   transmitting an acknowledgement of a received packet if said comparison of said received packet frame number is equal to said stored last received packet number plus 1; and
   incrementing said stored last received packet number by 1.

19. A method as in claim 18 further comprising the step of:

transmitting a request for retransmission by said receiving peripheral endpoint of a packet of data from said transmitting peripheral endpoint if said comparison of said received packet frame number against said last received packet number indicates that more than a predetermined number of packets have not been received by said receiving peripheral endpoint.

20. A method as in claim 18 further comprising the step of:

transmitting a request for retransmission by said receiving peripheral endpoint of a packet of data from said transmitting peripheral endpoint if said comparison of said received packet frame number against said last received packet number indicates that said received packet is not the next sequential packet from the packets already received by said receiving peripheral endpoint.

21. A method as in claim 12 further comprising the steps of:

dynamically assigning a reserved timeslot channel to a network terminator endpoint.

22. A method as in claim 21 further comprising the step of:

monitoring a second timeslot channel by a given network terminator endpoint while concurrently monitoring said reserved timeslot of said first network terminator.

* * * * *